(12) United States Patent
Heinonen et al.

(10) Patent No.: US 7,103,313 B2
(45) Date of Patent: Sep. 5, 2006

(54) AUTOMATIC DETERMINATION OF ACCESS POINT CONTENT AND SERVICES FOR SHORT-RANGE WIRELESS TERMINALS

(75) Inventors: Tomi Heinonen, Tampere (FI); Janne J. Kallio, Pattijobi (FI)

(73) Assignee: Nokia Corporation, Espoo (FI)

( * ) Notice: Subject to any disclaimer, the term of this patent is extended or adjusted under 35 U.S.C. 154(b) by 326 days.

(21) Appl. No.: 10/161,657

(22) Filed: Jun. 5, 2002

(65) Prior Publication Data

US 2003/0228842 A1 Dec. 11, 2003

(51) Int. Cl.
*H04B 5/00* (2006.01)

(52) U.S. Cl. ................. 455/41.2; 455/412.1; 455/414.2

(58) Field of Classification Search ................ 455/41.2, 455/41.3, 412.1, 412.2, 414.1, 414.2, 414.3; 370/338

See application file for complete search history.

(56) References Cited

U.S. PATENT DOCUMENTS

| | | |
|---|---|---|
| 5,493,692 A | 2/1996 | Theimer et al. |
| 5,606,617 A | 2/1997 | Brands |
| 5,668,878 A | 9/1997 | Brands |
| 5,696,827 A | 12/1997 | Brands |
| 5,749,081 A | 5/1998 | Whiteis |
| 5,778,304 A | 7/1998 | Grube et al. |
| 5,790,974 A | 8/1998 | Tognazzini |
| 5,835,061 A | 11/1998 | Stewart |
| 5,838,685 A | 11/1998 | Hochman |
| 5,987,099 A | 11/1999 | O'Neill et al. |
| 6,006,200 A | 12/1999 | Boies et al. |
| 6,023,241 A | 2/2000 | Clapper |
| 6,041,311 A | 3/2000 | Chislenko et al. |
| 6,044,062 A | 3/2000 | Brownrigg |
| 6,049,777 A | 4/2000 | Sheena et al. |
| 6,052,467 A | 4/2000 | Brands |
| 6,064,980 A | 5/2000 | Jacobi et al. |
| 6,065,012 A | 5/2000 | Balsara et al. |
| 6,092,049 A | 7/2000 | Chislenko et al. |
| 6,108,493 A | 8/2000 | Miller et al. |
| 6,108,688 A | 8/2000 | Nielsen |
| 6,119,101 A | 9/2000 | Peckover |
| 6,138,158 A | 10/2000 | Boyle et al. |
| 6,138,159 A | 10/2000 | Phaal |

(Continued)

FOREIGN PATENT DOCUMENTS

AU 200135071 10/2001

(Continued)

OTHER PUBLICATIONS

U.S. Appl. No. 10/083,134, filed Feb. 27, 2002, Heinonen et al.

(Continued)

*Primary Examiner*—Lee Nguyen
(74) *Attorney, Agent, or Firm*—Morgan & Finnegan, LLP

(57) ABSTRACT

A method and an apparatus in a short range wireless communication stores a list of keywords and a type list of information indicative of content and services available at an Access Point. A user terminal creates and stores a similar list of keyword and types. The user requests the keyword and types from the Access Point. This list is transmitted to the user within the service discovery protocol during connection set-up. The user Keyword list and Types are matched to the Access point Keywords and Types list to determine if a session should be established or terminated. The Access point may also connect to the terminal to obtain a list of the terminal Keywords and Types to determine if content is available to push to the terminal.

63 Claims, 13 Drawing Sheets

U.S. PATENT DOCUMENTS

| | | | |
|---|---|---|---|
| 6,167,278 | A | 12/2000 | Nilssen |
| 6,175,743 | B1 | 1/2001 | Alperovich et al. |
| 6,182,050 | B1 | 1/2001 | Ballard |
| 6,195,651 | B1 | 2/2001 | Handel et al. |
| 6,195,657 | B1 | 2/2001 | Rucker et al. |
| 6,199,099 | B1 | 3/2001 | Gershman et al. |
| 6,205,472 | B1 | 3/2001 | Gilmour |
| 6,236,768 | B1 | 5/2001 | Rhodes et al. |
| 6,243,581 | B1 | 6/2001 | Jawanda |
| 6,253,202 | B1 | 6/2001 | Gilmour |
| 6,253,203 | B1 | 6/2001 | O'Flaherty et al. |
| 6,263,447 | B1 | 7/2001 | French et al. |
| 6,266,048 | B1 | 7/2001 | Carau, Sr. |
| 6,272,129 | B1 | 8/2001 | Dynarski et al. |
| 6,275,824 | B1 | 8/2001 | O'Flaherty et al. |
| 6,285,879 | B1 | 9/2001 | Lechner et al. |
| 6,317,781 | B1 | 11/2001 | De Boor et al. ............. 709/217 |
| 6,321,257 | B1 | 11/2001 | Kotola et al. |
| 6,330,448 | B1 | 12/2001 | Otsuka et al. |
| 6,351,271 | B1 | 2/2002 | Mainwaring et al. |
| 6,414,955 | B1 | 7/2002 | Clare et al. .................. 370/390 |
| 6,421,707 | B1 | 7/2002 | Miller et al. ................. 709/206 |
| 6,430,395 | B1 | 8/2002 | Arazi et al. |
| 6,430,413 | B1 | 8/2002 | Wedi et al. |
| 6,438,585 | B1 | 8/2002 | Mousseau et al. |
| 6,445,921 | B1 | 9/2002 | Bell |
| 6,477,373 | B1 | 11/2002 | Rappaport et al. |
| 6,484,196 | B1 | 11/2002 | Maurille |
| 6,493,550 | B1 | 12/2002 | Raith |
| 6,496,849 | B1 | 12/2002 | Hanson et al. |
| 6,510,381 | B1 | 1/2003 | Grounds |
| 6,515,974 | B1 | 2/2003 | Inoue et al. |
| 6,519,453 | B1 | 2/2003 | Hamada et al. |
| 6,527,641 | B1 | 3/2003 | Sinclair et al. |
| 6,539,225 | B1 | 3/2003 | Lee |
| 6,542,740 | B1 | 4/2003 | Olgaard et al. |
| 6,549,768 | B1 | 4/2003 | Fraccaroli |
| 6,554,707 | B1 | 4/2003 | Sinclair et al. |
| 6,560,456 | B1 | 5/2003 | Lohtia et al. ................. 455/445 |
| 6,580,698 | B1 | 6/2003 | Nitta |
| 6,625,460 | B1 | 9/2003 | Patil |
| 6,674,403 | B1 | 1/2004 | Gray et al. |
| 6,678,516 | B1 | 1/2004 | Nordman et al. |
| 6,697,018 | B1 | 2/2004 | Stewart |
| 6,721,542 | B1 | 4/2004 | Anttila et al. |
| 6,785,542 | B1* | 8/2004 | Blight et al. .............. 455/426.1 |
| 2001/0021649 | A1 | 9/2001 | Kinnunen et al. |
| 2001/0039546 | A1 | 11/2001 | Moore et al. |
| 2002/0002705 | A1 | 1/2002 | Byrnes et al. ................. 725/14 |
| 2002/0006788 | A1 | 1/2002 | Knutsson et al. |
| 2002/0013815 | A1 | 1/2002 | Obradovich et al. |
| 2002/0015042 | A1 | 2/2002 | Robotham et al. |
| 2002/0019882 | A1 | 2/2002 | Soejima et al. |
| 2002/0022453 | A1 | 2/2002 | Balog et al. |
| 2002/0039882 | A1 | 4/2002 | Ternullo et al. |
| 2002/0052873 | A1 | 5/2002 | Delgado et al. |
| 2002/0061741 | A1 | 5/2002 | Leung et al. |
| 2002/0065881 | A1 | 5/2002 | Mansikkaniemi et al. |
| 2002/0082921 | A1 | 6/2002 | Rankin |
| 2002/0083025 | A1 | 6/2002 | Robarts et al. |
| 2002/0094778 | A1 | 7/2002 | Cannon et al. |
| 2002/0126872 | A1 | 9/2002 | Brunk et al. |
| 2002/0142792 | A1 | 10/2002 | Martinez |
| 2002/0158917 | A1 | 10/2002 | Sinclair et al. |
| 2002/0191017 | A1 | 12/2002 | Sinclair |
| 2002/0193073 | A1 | 12/2002 | Fujioka |
| 2002/0198882 | A1 | 12/2002 | Linden et al. |
| 2003/0002504 | A1 | 1/2003 | Forstadius .................. 370/392 |
| 2003/0008662 | A1 | 1/2003 | Stern et al. |
| 2003/0013459 | A1 | 1/2003 | Rankin et al. |
| 2003/0027636 | A1 | 2/2003 | Covannon et al. ............ 463/42 |
| 2003/0036350 | A1* | 2/2003 | Jonsson et al. ................ 455/41 |
| 2003/0054794 | A1 | 3/2003 | Zhang ........................ 455/403 |
| 2003/0092376 | A1 | 5/2003 | Syed ......................... 455/3.06 |
| 2003/0115038 | A1 | 6/2003 | Want et al. |
| 2003/0119446 | A1 | 6/2003 | Fano et al. |
| 2003/0119494 | A1 | 6/2003 | Alanara et al. |
| 2003/0171147 | A1 | 9/2003 | Sinclair et al. |
| 2003/0177113 | A1 | 9/2003 | Wakita |
| 2003/0207683 | A1 | 11/2003 | Lempio et al. |
| 2003/0208595 | A1 | 11/2003 | Gouge et al. |
| 2004/0002948 | A1 | 1/2004 | Mantyjarvi et al. |
| 2004/0181517 | A1 | 9/2004 | Jung et al. |
| 2005/0136837 | A1 | 6/2005 | Nurminen et al. |

FOREIGN PATENT DOCUMENTS

| | | |
|---|---|---|
| BE | 1010909 | 3/1999 |
| EP | 0 891 110 A1 | 1/1999 |
| EP | 0 944 176 | 9/1999 |
| EP | 0 041 849 A1 | 10/2000 |
| EP | 1 041 849 A1 | 10/2000 |
| EP | 1 130 869 A1 | 9/2001 |
| EP | 1 187 023 A1 | 3/2002 |
| EP | 0 788 065 B1 | 6/2002 |
| EP | 1217792 | 6/2002 |
| EP | 1271885 A2 | 1/2003 |
| EP | 1 282 289 A2 | 2/2003 |
| FI | 112999 B | 2/2004 |
| JP | 11 110401 A | 7/1999 |
| WO | WO 97/49255 | 12/1997 |
| WO | WO 99/32985 | 7/1999 |
| WO | WO 99/37105 | 7/1999 |
| WO | WO 99/51048 | 10/1999 |
| WO | WO 99/66428 | 12/1999 |
| WO | WO 00/11563 | 3/2000 |
| WO | WO 00/11793 | 3/2000 |
| WO | WO 00/32002 | 6/2000 |
| WO | WO 00/69202 | 11/2000 |
| WO | WO 00/74424 A1 | 12/2000 |
| WO | WO 01/35253 | 5/2001 |
| WO | WO 01/35269 | 5/2001 |
| WO | WO 01/39577 A1 | 6/2001 |
| WO | WO 01/46826 | 6/2001 |
| WO | WO 01/50299 | 7/2001 |
| WO | WO 01/67799 A2 | 9/2001 |
| WO | WO 01/82532 | 11/2001 |
| WO | WO 01/86419 A2 | 11/2001 |
| WO | WO 02/03626 | 1/2002 |
| WO | WO 02/11456 | 2/2002 |
| WO | WO 03/017592 A1 | 2/2003 |
| WO | WO2004/4372 | 1/2004 |

OTHER PUBLICATIONS

The Bluetooth Special Interest Group, Specification of The Bluetooth System, vol. 1 & vol. 2, Core and Profile: Version 1.1, Feb. 22, 2001.

Jaap Haartsen, "Bluetooth-The universal radio interface for *ad hoc*, wireless connectivity," Ericsson Review No. 3, 1998, pp. 110-117.

"A Multi-Agent Referral System for Matchmaking" Leonard N. Foner, MIT Media Lab, Apr. 22, 1996, pp. 245-261.

Bisdikian et al. "Quest in a tetherless world", Wireless Communication and Mobile Computing, 2002, 2:449-464.

Symbian, Library http://www.symbian.com/developer/techlib/v70docs/SDL_v7.0/doc_source/DevGuides/ccp/Bluetooth/UsingBluetoothSockets/HowToFindAnd_ConnectToADevice/Howtoselectaservice.html.

Peddemores et al. "Combining presence, location and instant messaging in a context-aware mobile application framework" GIGAMOBILE/D2.8, 2002, https://doc.telin.nl/dscgi/ds.py/Get/File21982/PLIM_d28.pdf.

Bluetooth Specification, "Bluetooth Assigned Numbers, Appendix VIII", Version 1.0B, Nov. 29, 1999, pp. 1010-1032.
Bluetooth Specification Version 1.0 B; Service Discovery Protocol, Dec. 1, 1999, pp. 324-384.

Abstract of FI 200200412A (Nokia Corp., Sep. 5, 2003), Database WPI, Derwent Publications Ltd.

* cited by examiner

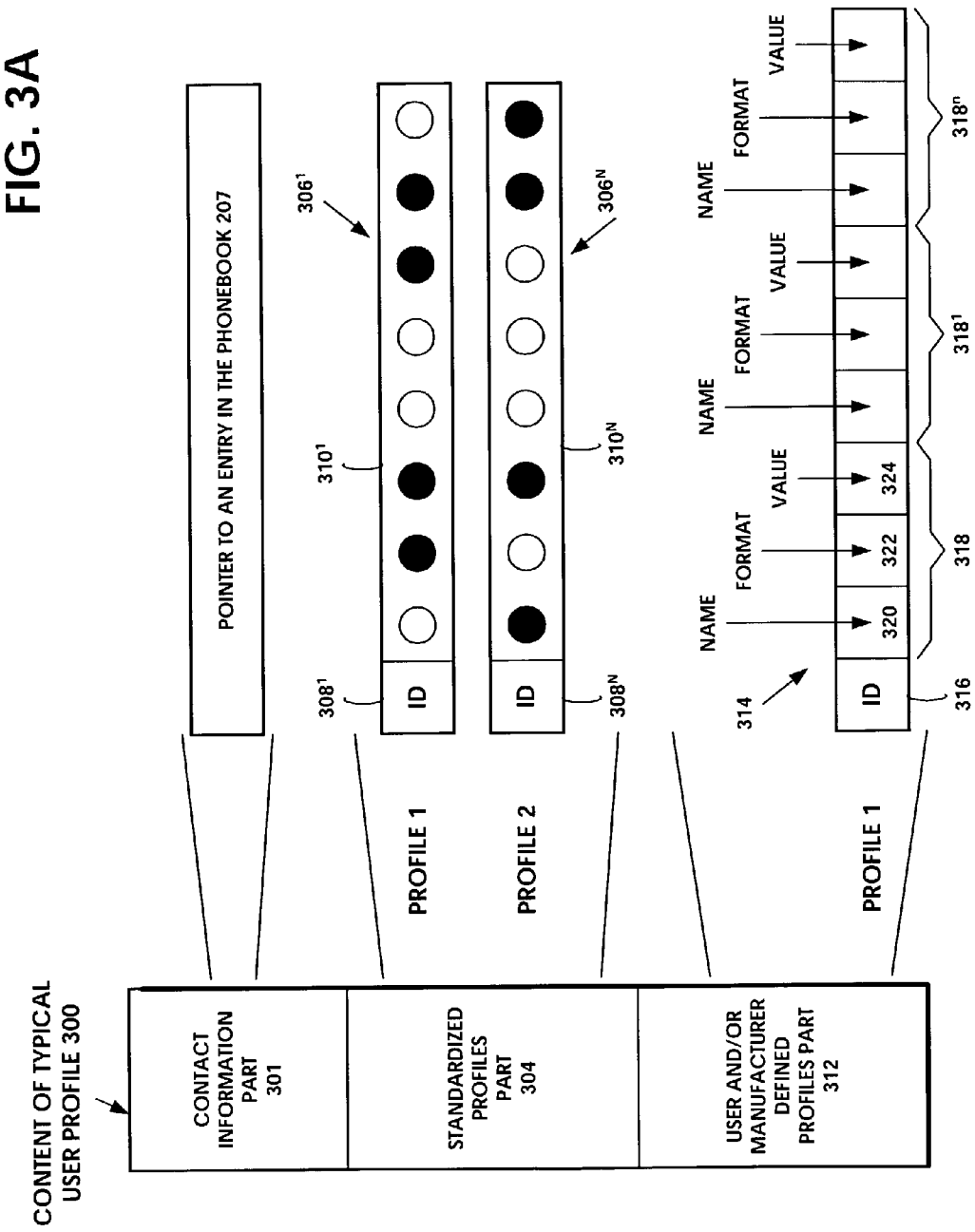

FIG. 4C

```
Type:
Advertisement

Keywords:
food; recipes; restaurants;
drinks; pizza
```

FIG. 4A

```
AGENT:
BEGIN:VCARD
VERSION:2.1
N:Friday;Fred
TEL;WORK;VOICE:+1-213-555-
1234
TEL;WORK;FAX:+1-213-555-5678
END:VCARD
```
401

FIG. 4B

```
<!DOCTYPE user-profile [
<!ELEMENT user-profile (profile-
item*)>
<!ATTLIST user-profile
version CDATA #FIXED "1.0">
<!ELEMENT user-profile EMPTY>
<!ATTLIST filtering-parameters
name CDATA #IMPLIED
type CDATA #IMPLIED
value CDATA #IMPLIED>
]>
```
450

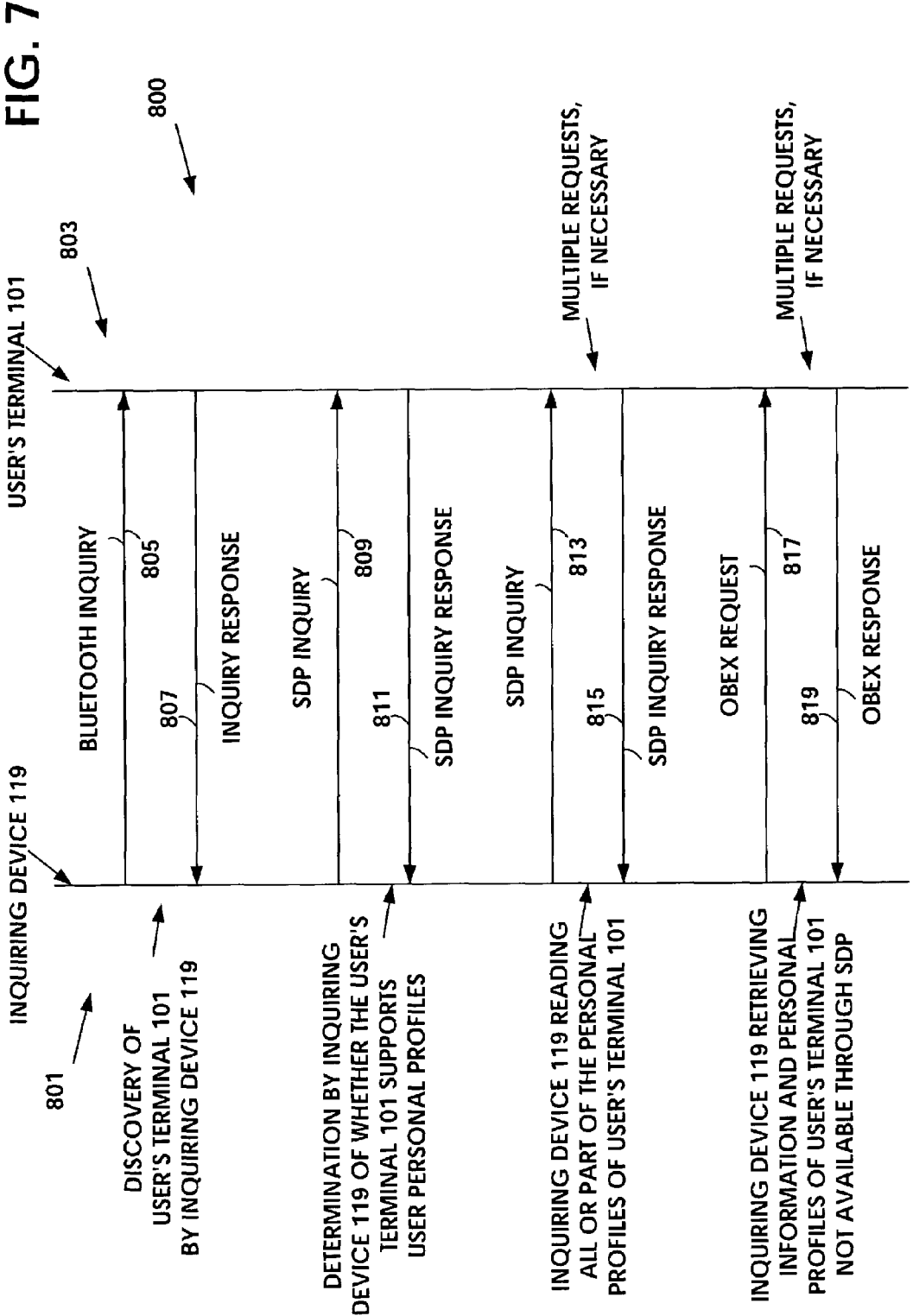

AUTOMATIC DETERMINATION OF ACCESS POINT CONTENT AND SERVICES FOR SHORT-RANGE WIRELESS TERMINALS

CROSS REFERENCE TO RELATED APPLICATIONS

This application is related to copending U.S. application Ser. No. 10/083,134, filed Feb. 27, 2002, entitled "Personal Profile Sharing and Management for Short-Range Wireless Terminals," which is incorporated herein by reference in its entirety.

FIELD OF THE INVENTION

The present invention relates to short-range wireless communication systems, network and methods of operation. More particularly, the invention relates to automatic determination of Access point content and services by terminals in a short-range wireless communication system using the Blueioooth Standard.

BACKGROUND OF THE INVENTION

An ad hoc network is a short-range wireless system composed primarily of mobile wireless devices which associate together for a relatively short time to carry out a common purpose. A temporary network such as this is called a "piconet" in the Bluetooth Standard, an "independent basic service set" (IBSS) in the IEEE 802.11 Wireless LAN Standard, a "subnet" in the HIPERLAN Standard, and generally a radio cell or a "micro-cell" in other wireless LAN technologies. Ad hoc networks have the common property of being an arbitrary collection of wireless devices which are physically close enough to be able to communicate and which are exchanging information on a regular basis. The networks can be constructed quickly and without much planning. Members of the ad hoc network join and leave as they move into and out of the range of each other. Most ad hoc networks operate over unlicensed radio frequencies at speeds of from one to fifty-four Mbps using carrier sense protocols to share the radio spectrum. The distance over which they can communicate ranges from ten meters for Bluetooth ad hoc networks to over one hundred meters for wireless LAN micro-cells in an open environment. ad hoc networks consist primarily of mobile wireless devices, but can also include one or more access points which are stationary wireless devices, operating as a stand-alone server or connected as gateways to other networks.

Bluetooth is a short-range radio network, originally intended as a cable replacement. It can be used to create ad hoc networks of up to eight devices operating together. The Bluetooth Special Interest Group, *Specification Of The Bluetooth System*, Volumes 1 and 2, Core and Profiles: Version 1.1, Feb. 22, 2001, describes the principles of Bluetooth device operation and communication protocols. The devices operate in the 2.4 GHz radio band reserved for general use by Industrial, Scientific, and Medical (ISM) applications. Bluetooth devices are designed to find other Bluetooth devices within their ten-meter radio communications range and to discover what services they offer, using a service discovery protocol (SDP). The SDP searching function relies on links being established between the requesting Bluetooth device in a client role and the responding Bluetooth device in a server role. Once a link has been established, it can be used to find out about services in the responding Bluetooth device and how to connect to them.

Other wireless standards support ad hoc networks in addition to the Bluetooth standard, the IEEE 802.11 Wireless LAN standard, and the HIPERLAN standard. Examples include the IEEE 802.15 Wireless Personal Area Network (WPAN) standard, the Infrared Data Association (IrDA) standard, the Digital Enhanced Cordless Telecommunications (DECT) standard, the Shared Wireless Access Protocol (SWAP) standard, the Japanese 3rd Generation (3G) wireless standard, and the Multimedia Mobile Access Communication (MMAC) Systems standard of the Japanese Association of Radio Industries and Businesses.

Bluetooth units have general behaviors through which they communicate with other units. These behaviors are called "application profiles". There are 13 application profiles described in Version 1.1 of the specification, including the Generic Access Profile (GAP), Service Discovery Profile (SDP), Generic Object Exchange Profile (GOEP), and Object Push Profile.

The Generic Access Profile (GAP) defines how two Bluetooth units discover and establish a connection with each other. The service discovery protocol (SDP) defines the investigation of services available to a Bluetooth unit from other units. Generic Object Exchange Profile (GOEP) describes defines the set of protocols and procedures used by applications in handling object exchanges, e.g. File Transfer Synchronization using the Object Exchange (OBEX) Standard. The OBEX Standard is specified by the Infrared Data Association (IrDA), Object Exchange Protocol, Version 1.2. The OBEX Standard was adopted by Bluetooth as a binary HTTP protocol that allows multiple request/response exchanges. The Bluetooth Object Push Profile specification discusses the application of exchanging virtual business cards using the OBEX Standard.

Personal profiles are different from the official set of thirteen Bluetooth application profiles. Personal profiles are data sets intended to be exchanged between wireless mobile devices. Personal profiles provide information describing a user and his/her device to inform other users about the functionality and communication features of the user's device, and to inform about the characteristics and interests of the user. Currently, personal profiles are created by a user and sent to centralized servers operated by service providers for management and access by other users.

Bluetooth Access points provide TCP/IP services to the terminal applying the profile. A user terminal is capable of finding an Access Point service based on the Bluetooth Service Discovery Protocol (SDP). However, the terminal cannot obtain any additional/detailed information for the services content provided by the Access Point. If a user is interested only in some specific services/content, it is not useful to form the initial connection to all provided Access Points. Still the user cannot know the content before forming the connection and browsing the content.

What is needed is a mechanism or technique enabling a user terminal to automatically determine Access Point content and services during connection set-up and also to enable the Access Point to determine whether there is content to "push" to the terminal. Additionally, there is a need for a technique to provide information filtering in connection establishment between devices.

Prior art related to personal profiles includes EP 1 130 869 A1 entitled "Management of User Profile Data" by D. Mandata, published Sep. 5, 2001, filed Mar. 1, 2000. This reference discloses an Instant Message Broker (IMB) System to allow messages to be sent in near real time between users. IMB is a distributed processing system that integrates network technologies, such as IP and Mobil Telecomm networks, allowing users to access functionality, accomplish tasks and deliver process information to called parties. IMB includes a database for storing and managing user profile data, which represents sets of user information/or user preferences concerning the terminal device users have access to within information transmission. The database comprises for each user at least one customizable user profile, which can be created, edited and/deleted by the user. Each customizable user profile is associated with an environment of the user representing a physical location and/or a logical context of the user. The database comprises a plurality of user profiles for one user, wherein only one user profile of a user is active at the same time. Each subscriber can have a plurality of user profiles in a so-called user space which is a subscriber's own data space as provisioned within the user profile database. Users can define different context for different situations and dynamically switch between them. The currently used active context describes how the subscriber can be reached. The description includes an indication whether the user is currently on-line on a preferred terminal device. In addition, a set of alternative terminal devices is provided where the IMB subscriber may be contacted or not reachable at the preferred device. The alternative terminal devices can also be used for receiving additional copies of instant messages.

The prior art does not describe or suggest a wireless, mobile terminal containing personalized user profiles that are installed, edited by and managed by the user on the user's mobile terminal, the profiles containing a list(s) of content and services of interest to the user. Moreover, the prior art does not describe or suggest list(s) transmitted by an access point, the list transmitted to the access point with in the Service Discovery Protocol during connection set up time that enables the user to obtain information regarding content and services offered by the Access Point by matching Keywords and Types in the list with information in the user profile.

Further, the prior art does not describe or suggest an Access Point pushing information to the terminal where the pushed information matches the content and services described in the list contained in the profile.

SUMMARY OF INVENTION

To overcome limitations in the prior art described above, and to overcome other limitations that will be apparent upon reading and understanding the present specification, the present invention is directed to provide a method and an apparatus for storing a list of keywords, e.g. search words and a type list of information, e.g advertisement, news, indicative of content and services available at an Access Point and incorporating into the terminal profile a similar list of content and services by keyword and type where the keywords/types can be added/removed either inclusively or exclusively. The keywords and type of services of interest to the user are stored in a terminal database. On querying the Access Point within the Service Discovery Protocol during connection set-up, the Access point provides the list of keywords and types to the terminal. The user Keyword list and Types are matched to the Access point Keywords and Types list to determine if a connection should be established for matching Keywords and Type or terminated in the case of the failure of Keywords and Types of the Access Point and Terminal to match. The Access point may also connect to the terminal to obtain a list of the terminal Keywords and Types to determine if content is available to push to the terminal. Alternatively, other profiles may be stored at the Access Point to include keywords relating to WAP over Bluetooth, OBEX or a profile to store and maintain keywords. As a result, content services can be "advertised" automatically without the need for user interaction or obtained for special services. The content may be filtered within the Bluetooth communication.

In one aspect, an Access Point describes and stores content and services in terms of keywords and types in a list available from the Access Point or within outside networks connected to the Access point, and providing the content and/or services to a requesting terminal having keywords and types which match the keywords and types in the terminal within the Service Discovery Protocol and during connection set-up.

In another aspect, a personal profile in a terminal includes a field indicative of an Access Point service type of interest to the user, the field provided to the Access Point within the Service Discovery Protocol during connection set-up.

In another aspect, a personal profile in a terminal includes a field indicative of a content/topic of a service type of interest to the user and available from an Access Point.

In another aspect a personal profile in a terminal includes a field indicative of both the service type and content/topic of the service available from an Access point.

A feature of the invention is creating, editing and storing personal profiles of a user in a wireless, mobile terminal including keywords and types describing services and content of interest to a user for acquisition from an Access Point having matching keywords and content in an ad hoc network in a short-range communication system.

Another feature of the invention is storing all personal profiles of a user in a single Service Discovery Protocol (SDP) record, the record containing contact information, user or manufacturer defined information and standard format profiles of the user's interests including keywords and types of content and services that are of interest to the user and potentially available from an access point.

Still another feature of the invention is storing other profiles at the Access Point including WAP over Bluetooth, OBEX and storing and maintaining keywords and types as inclusive or exclusive keywords and exclusive and inclusive types.

DESCRIPTION OF THE DRAWINGS

The invention will be further understood from the followed description of a preferred embodiment taken in conjunction with the appended drawings.

FIG. 3A is a representation of a typical user personal profile formatted in a bit mask, as one embodiment, in the user's terminal 101 of FIG. 1.

FIG. 4A is a representation of a text-encoded vCard format available in the contact information part 301 of Table A, according to an embodiment of the present invention.

FIG. 4B is a representation of an XML encoded nonstandard profile available in the SDP record of Table A, according to an embodiment of the present invention.

FIG. 4C is a representation of a type list and related keywords stored in a user terminal for matching against keyword and types stored in an Access point, according to an embodiment of the present invention.

FIG. 7 describes a method for accessing a personal profile of the user terminal with user profile support in the ad hoc network of FIG. 1, according to an embodiment of the present invention.

DESCRIPTION OF PREFERRED EMBODIMENT

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
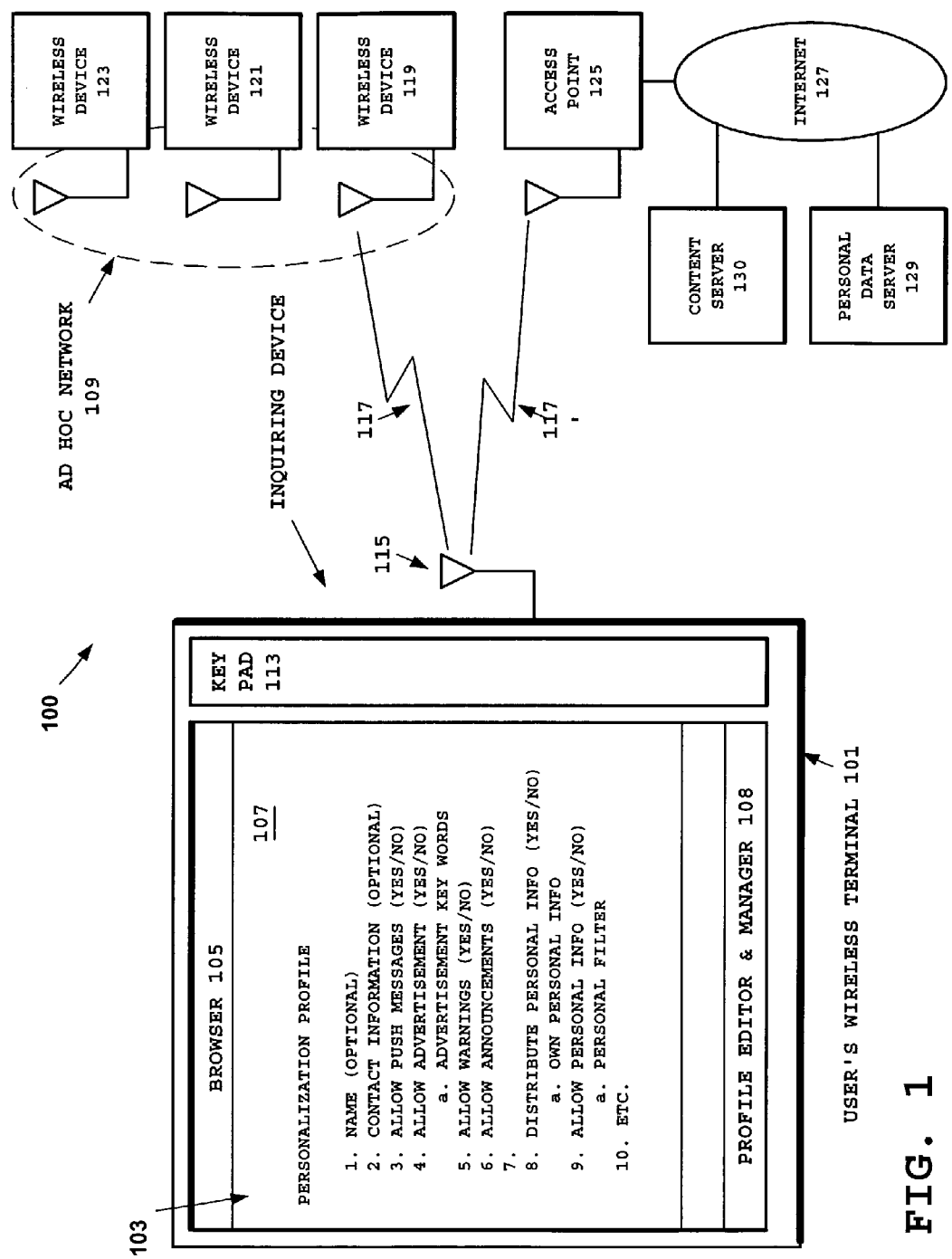
FIG. 1 is a representation of a user terminal or wireless device in an ad hoc network, according to an embodiment of the present invention.

FIG. 1 discloses a system 100 according to an embodiment of the present invention, which provides personal profile sharing for wireless, mobile terminals in ad hoc networks. A user's terminal 101, typically a Bluetooth device, includes a memory 103 storing a browser 105, an operating system (not shown), a profile editor and manager 108, and a personal profile 107 indicating the user's interests or receiving queries from other terminals in an ad hoc network 109. The user's terminal 101 includes a display, a keypad 113 and an antenna 115 for sending and receiving signals 117 to and from other Bluetooth devices 119, 121 and 123 in a short-range communication system. Antenna 115 also sends and receives signals 117' with an access point 125 linked to an outside network 127, e.g. the Internet, to a personal data server 129 operated by a service provider. The following description is provided for the terminals or wireless devices in the system 100 implemented as Bluetooth devices. However, the terminals or wireless devices in the system 100 can also be implemented in other wireless standards such as the IEEE 802.11 Wireless LAN standard and the HIPERLAN standard.

A content server 130 is coupled to access point 125 by network 127. Content server may store content that access point delivers information about, according to the present invention. Alternatively, the content may be stored locally by access point 125.

A connection between two Bluetooth devices is initiated by an inquiring device sending out an inquiry message containing an inquiry access code (IAC), searching for other devices in its vicinity. Any other Bluetooth device that is listening for an inquiry message containing the same inquiry access code (IAC), by means of conducting an inquiry scan, will recognize the inquiry message and respond. The inquiry response is a message packet containing the responding device's Bluetooth Device Address (BD_ADDR). A Bluetooth device address is a unique, 48-bit IEEE address, which is electronically engraved into each Bluetooth device.

The inquiring device uses the information provided in the inquiry response packet, to prepare and send a paging message to the responding device. To establish a connection, the inquiring device must enter the page state. In the page state, the inquiring device will transmit initial paging messages to the responding device using the device access code and timing information acquired from the inquiry response packet. The responding device must be in the page scan state to allow the inquiring device to connect with it. Once in the page scan state, the responding device will acknowledge the initial paging messages and the inquiring device will send a paging packet, which provides the clock timing and access code of the inquiring device to the responding device. The responding device responds with a page acknowledgment packet. This enables the two devices to form a connection and both devices transition into the connection state. The inquiring device that has initiated the connection assumes the role of a master device and the responding device assumes the role of a slave device in a new ad hoc network.

Each ad hoc network has one master device and up to seven active slave devices. All communication is directed between the master device and each respective slave device. The master initiates an exchange of data and the slave responds to the master. When two slave devices are to communicate with each other, they must do so through the master device. The master device maintains the ad hoc network's network clock and controls when each slave device can communicate with the master device. Members of the ad hoc network join and leave as they move into and out of the range of the master device. Ad hoc networks support distributed activities, such as collaborative work projects, collaborative games, multi-user gateways to the Internet, and the like. A user's device that joins a particular ad hoc network, does so to enable its user to participate in the currently running collaborative activity.

Figure 2A:
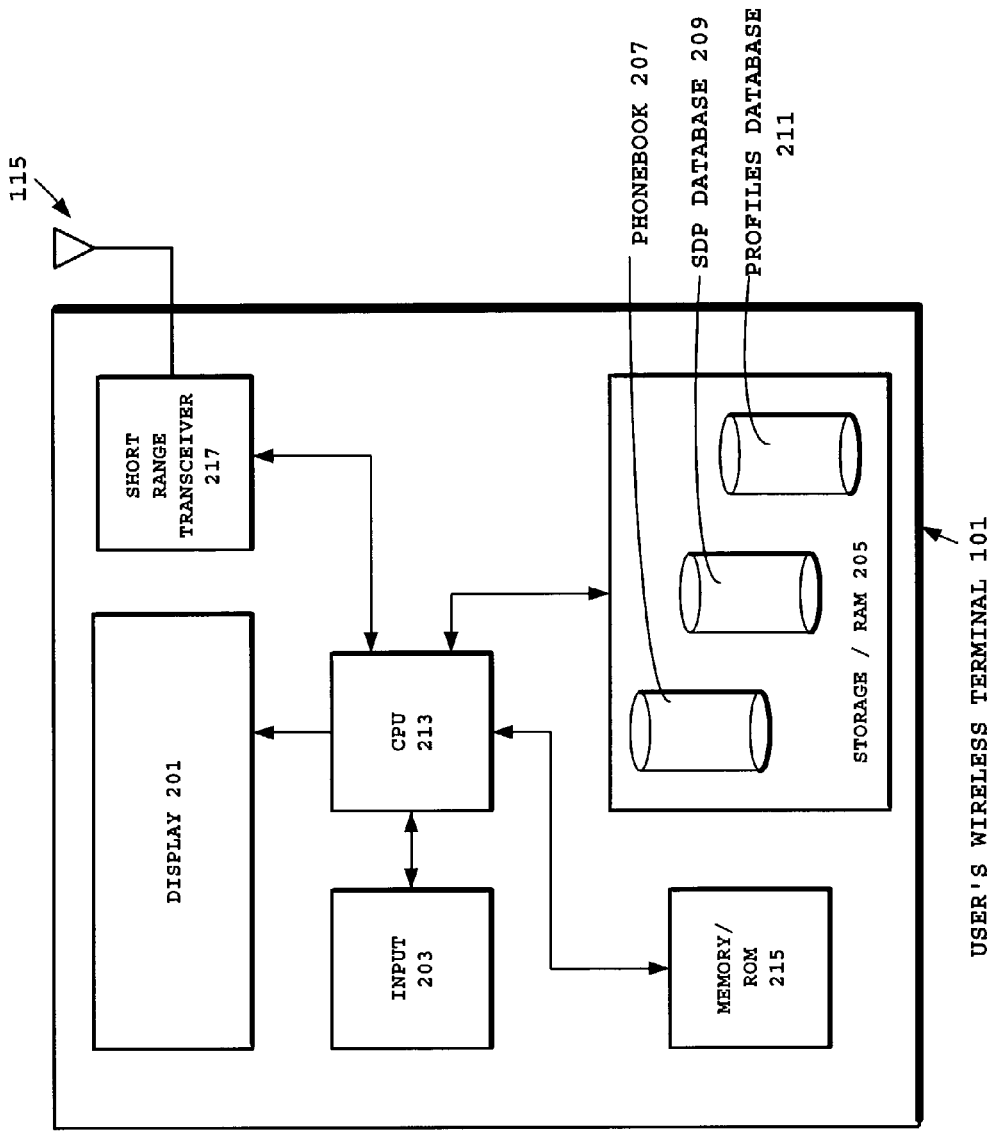
FIG. 2A is a representation of one embodiment of an internal architecture for the user terminal of FIG. 1.

FIG. 2A discloses one embodiment of the user's terminal 101. Included in the terminal 101 is a display 201 for displaying messages received from the access point 127 and the other terminals 119, . . . 123 in a piconet, e.g. the ad hoc network 109. An input device 203 such as the key pad 113, enables the user to enter data for transmission to the access point or other terminals. Input device 203 enables the user to input changes to the user's personal profiles stored in a storage area 205, including phone book information 207, Service Discovery Database 209, and a Personal profile database 211. A CPU 213 is connected to both the input 203, the storage devices 205, and to a memory 215 containing an operating system (not shown) and protocol for the Bluetooth connection/ disconnection processes described above. A short-range transceiver 217 is linked to the antenna 115 for sending and receiving signals to the devices 119, 121 and 123 and to the access point 125.

Unlike the implementation of FIG. 2A, further implementations of the user's terminal 101 do not include a dedicated phone book 207, SDP 209, or profiles database 211. Instead, the user's terminal includes a database (not shown) that is stored within the storage 205. This database maintains a list/database of keywords corresponding to user's current interests. In such implementations, the Access Point 125 sends keywords within an SDP response, and within the user's terminal 101, dedicated software instructions executed by CPU 213, for example, compares the keywords received within the SDP response with the keyword list stored in this database.

Figure 2B:
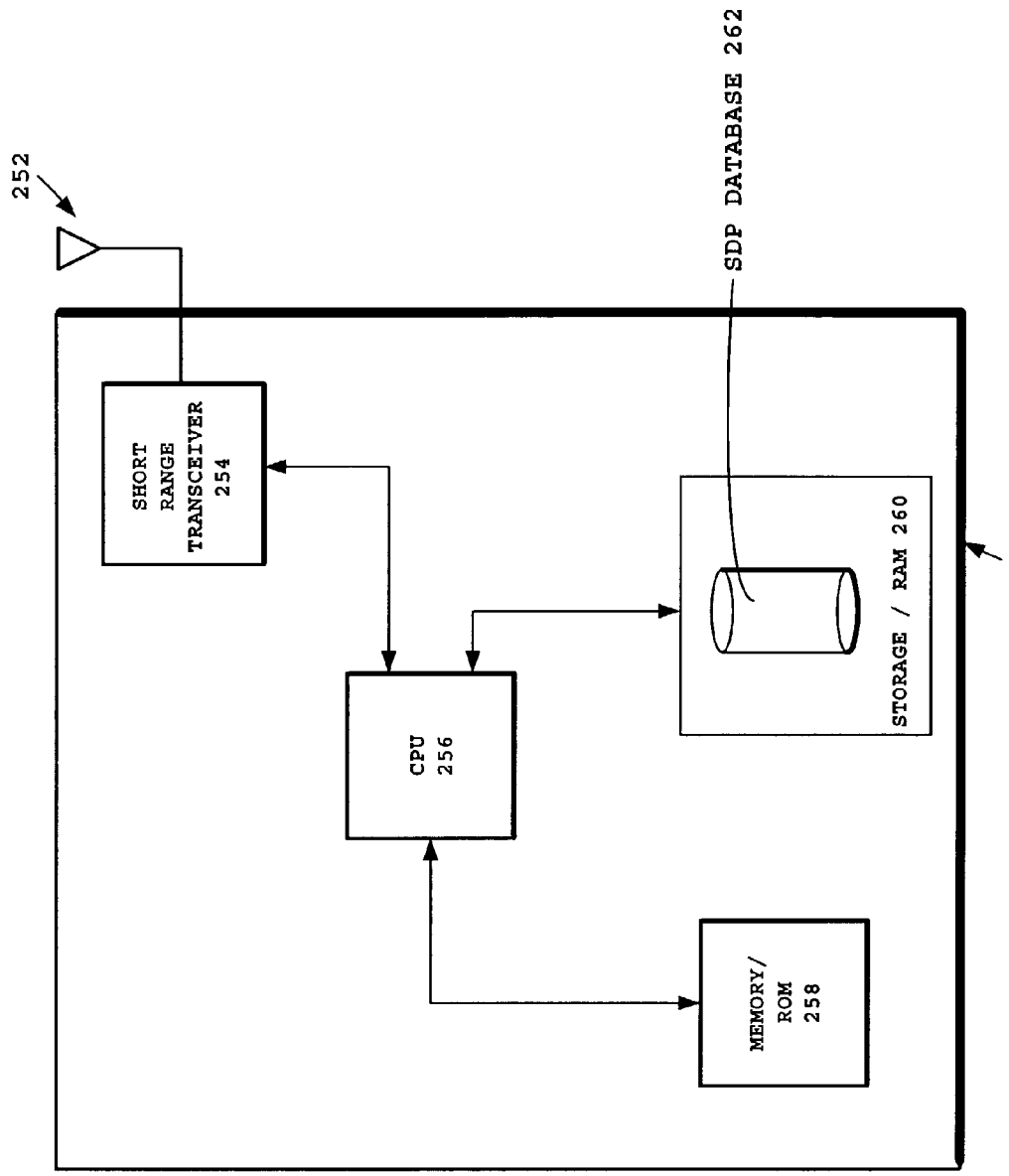
FIG. 2B is a representation of one embodiment of an internal architecture for the access point of FIG. 1.

FIG. 2B discloses one embodiment of the access point 125. Included in the access point 125 is a Service Discovery Database 209 that is included in a storage medium 260. A CPU 256 is connected to both a memory 258 and storage medium 260, and to a short-range transceiver 254 that is linked to an antenna 252 for sending and receiving signals to devices, such as the user's terminal 101. The SDP Database 262 may store information regarding content and types of services offered by the access point 125. This information may be in the form of lists of keywords, and may be arranged in the manner that is described below with reference to FIGS. 3A and 3B, as well as Tables A and B.

In the ad hoc network 109 of FIG. 1, the user's terminal 101 sends inquiries to other Bluetooth devices in the area, such as the access point 125. The inquiring device (i.e., the user's terminal 101) periodically transmits inquiry packets. The general inquiry access code (GIAC) of the packet is recognized by all Bluetooth devices as an inquiry message. During the inquiry procedure, any other Bluetooth devices that are in the inquiry scan state, such as the access point 125, are scanning for the receipt of inquiry packets. If the access point 125 in the inquiry scan state receives the inquiry packet with a matching IAC, it will respond with an inquiry response packet that has sufficient information to enable the user's terminal 101 to build its inquiry response table of essential information required to make a connection. Any Bluetooth device recognizing the inquiry packet can respond. The user's terminal 101 can now initiate a connection with the access point 125. The user's terminal 101 uses the information provided in the inquiry response packet, to prepare and send a paging message to the access point 125. To establish a connection, the user's terminal 101 must enter the page state, where it will transmit paging messages to the access point 125 using the access code and timing information acquired from the inquiry response packet. The access point 125 must be in the page scan state to allow the user's terminal 101 to connect with it. Once in the page scan state, the access point 125 will acknowledge the paging messages and the user's terminal 101 will send a paging packet, which provides the clock timing and access code of the user's terminal 101 to the access point 125. The access point 125 responds with a page acknowledgment packet. This enables the two devices to form an asynchronous connection-less (ACL) link and both devices transition into the connection state.

The user's terminal 101 can then send to the access point 125, a Service Discovery Protocol (SDP) search request packet. The SDP Request packet carries the SDP Service Search Attribute Request which includes a service search pattern and an attribute ID list. The service search pattern is the description of the pattern for the access point 125 to match in the service registry of its SDP database 262. If the access point 125 has the service requested, it responds with the service's handle. The service handle identifies the service for which the attributes are being requested. The attribute ID list identifies the attributes that the inquiring device (i.e., the user's terminal 101) is requesting.

The SDP service registry in the SDP database 262 stores service records in a browsing hierarchy. The service records may be arranged into a hierarchy structured as a tree that can be browsed. The user's terminal 101 can begin by examining the public browse root, and then follow the hierarchy out to service classes which are the branches of the tree, and from there to the leaf nodes, where individual services are described in service records. To browse service classes or to get specific information about a service, the inquiring device (e.g., the user's terminal 101) and the access point 125 exchange messages carried in SDP packets. There are two types of SDP packets, the SDP Service Search Attribute Request packet and the SDP Service Search Attribute Response packet. The SDP Request packet carries the SDP Service Search Attribute Request, which includes a service search pattern and an attribute ID list. The service search pattern is the description of the pattern for the access point 125 to match in its SDP service registry in the database 209. If the access point 125 has the service requested, it responds with the service's handle. The service handle identifies the service for which the attributes are being requested. The attribute ID list identifies the attributes that the user's terminal 101 is requesting. For example, the attribute ID list may identify attributes regarding content and service type. The SDP response packet returned by the access point 125 carries the SDP Service Search Attribute Response which includes a service record handle list and the attributes. The service record handle list and the attributes are then examined by the user's terminal 101.

As described above, an inquiry response packet from the access point 125, has sufficient information to enable the user's terminal 101 to build an inquiry response table of essential information required to make a connection. The Bluetooth frequency hop synchronization (FHS) packet structure for an inquiry response packet sent by the access point 125, includes a class-of-device (CoD) field. In one aspect of the invention, whenever the access point 125 provides information regarding content and service type information available to inquiring devices, the access point 125 writes into the class-of-device (CoD) field of its inquiry response packet, its status as having content and service type information available.

The inquiring device 101 constructs the inquiry response table with the information in the inquiry response packets received from responding devices, such as the access point 125. The inquiry response table shows the essential information gathered by the link controller in the inquiring device 101, which is needed to make a connection with any of the responding wireless devices. In this aspect of the invention, any responding devices are flagged, such as the access point 125, that have a class-of-device (CoD) field with the status of having its content and service type information available.

There are several options that can be programmed in the inquiring device 101, for processing the data gathered in the inquiry response table. The inquiring device 101 can be programmed to determine whether the class-of-device (CoD) field for a responding device has the status of having its content and service type information available. If so, then the inquiring device 101 can browse or search the SDP service records of the access point 125, since it is now known that they have content and service type information available. Since an analysis of the class-of-device (CoD) field only requires the receipt of an inquiry response packet, and does not require the completion of a connection between the two devices, this option provides a quick search of responding devices. The inquiring device 101 can provide to its user a "QUICK SEARCH" option in its initial logon menu, which can invoke the process to check the data gathered in the inquiry response table to determine whether the class-of-device (CoD) field for any responding device has the status of having its content and service type information available. This implementation is optional.

As described above, the CoD may act as a trigger for the SDP keyword searching. However, embodiments of the present invention, may not employ such dedicated CoD fields. Moreover, embodiments of the present invention may involve the access point 125 sending an SDP record that includes a generic indicator pointing out that content and service type information is available.

Figure 3B:
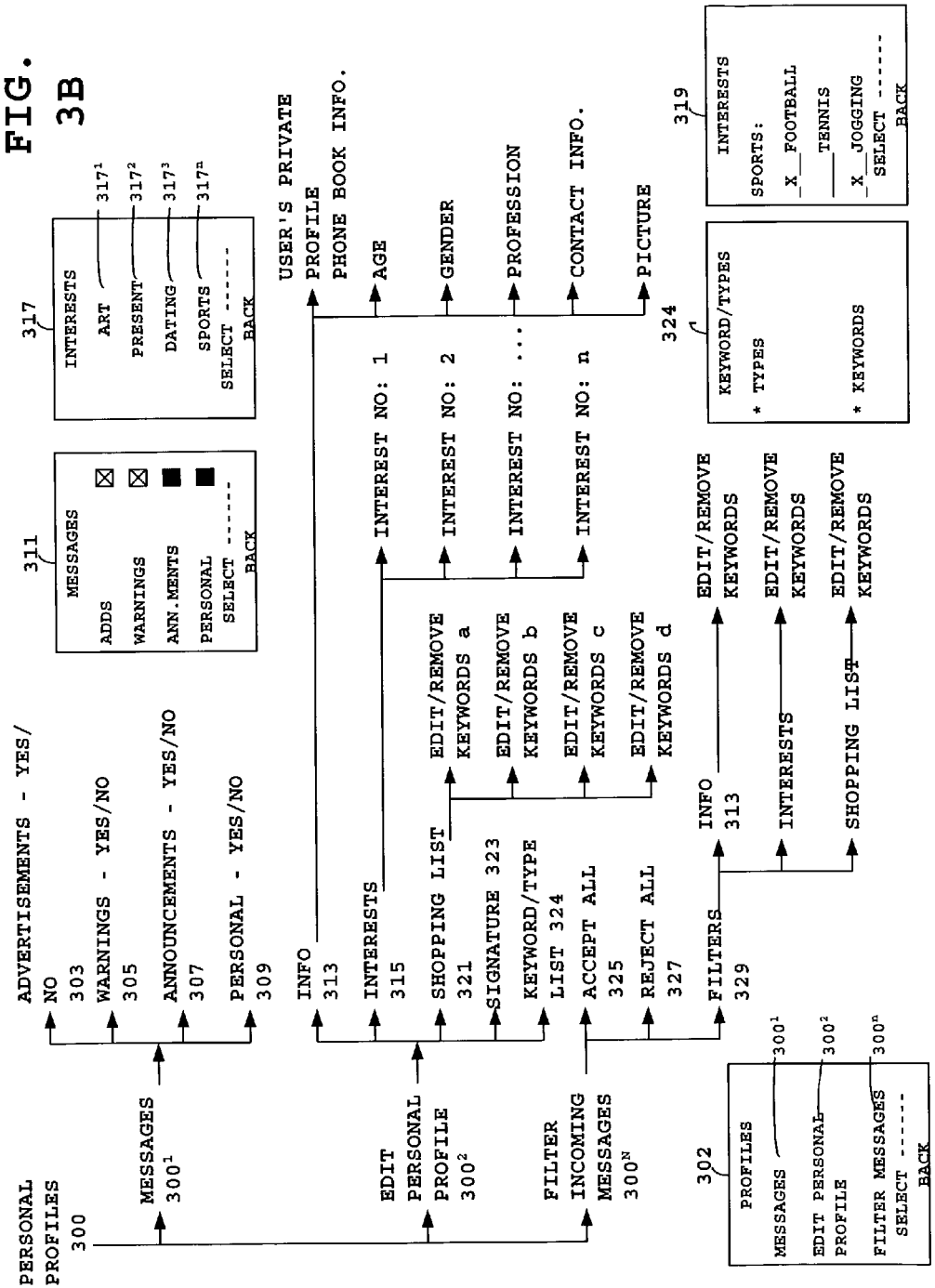
FIG. 3B is a detailed representation of the user personal profile of FIG. 3A for the user's terminal of FIG. 1 including keywords and types of content and services provided by an Access Point and of interest to the user. The terminal screens 302, 311, 317, 319 and 321 show the display on the user's terminal 101, of the profile items and categories.

FIG. 3A is an overview of a typical user profile 300 stored in memory 215 (FIG. 2A) as a record and including contact information 301 having a pointer to an entry in the phonebook 207 (FIG. 2) for responding to queries from another user in the ad hoc network. The profile 300 further includes a standardized profile part 304 defining the user's personal information, interest and other matters, as will be described in more detail in connection with FIG. 3B. In one embodiment, the record may include a plurality of "bit masks" $306^1 \ldots 306^N$, where the plurality is an integer "N". Each bit mask contains two bytes representing a profile, where byte 308 identifies the profile in part 304 and byte 310 enables the user to characterize the content of that profile. The profile may be characterized, in one embodiment by identifying the qualities of the profile using binary 1s (illustrated by filled circles) and binary 0s (illustrated by empty circles) to indicate yes/no choices, respectively or vice versa. There can be bit mask values that are assigned by convention to indicate generic interests such as art, dating, and sports. The bit masks 306 can be used to facilitate the user's selection of one profile among many profiles that the user has stored in the SDP database 209. The bit masks can also be used to facilitate communication with the access point 125. The access point 125 can retrieve a bit mask 306 in an SDP response packet returned by the user's terminal 101. The SDP response packet carries the SDP Service Search Attribute Response which includes the bit mask. The bit mask can then be examined by the access point 125, comparing its value with reference bit mask values indicating the generic interests.

Profile 300 of FIG. 3A further includes user and/or manufacturer defined profile part 312 represented by a datastream 314, including a user identification field 316 having a plurality of 3-part sub-fields $318^1$, $318^2$, to $318^n$, where the plurality is an integer "n". Each subfield contains a name portion 320 identifying a user or a manufacturer associated with the terminal, a format portion 322 defining specific information related to the name or the manufacture, and a value portion 324 providing a code representing the specific information related to the user or manufacturer. The datastream 314 can be used to facilitate the user's selection of one profile among many profiles that the user has stored in the SDP database 209. The datastream 314 can also be used to facilitate communication with the access point 125. The access point 125 can retrieve a datastream 314 in an SDP response packet returned by the user's terminal 101. The SDP response packet carries the SDP Service Search Attribute Response which includes the datastream 314. The datastream 314 can then be examined by the inquiring device 119.

FIG. 3B shows a more detailed view of the personal profile 300 comprising a plurality of sub-profiles. A sub-profile $300^1$ defines message processing. A sub-profile $300^2$ provides editing of personal profiles related to user information, interests, etc. A sub-profile $300^N$ provides processes for filtering messages received from users on the ad hoc network. Each sub-profile includes a list of user interests defined by a plurality of fields, each field including a series of attributes, where each attribute is defined by a name, a type and a value.

The sub-profile $300^1$ in FIG. 3B, sorts received messages that are received from the ad hoc network or access point into advertisements 303, warnings 305, announcements 307, and personal messages 309. Using the *Platform For Interconnect Content Selection (PICS) Rules,* published at http://www.w3.org/PICS, a screening program that provides an indicator describing the content of each message. The indicator is recognized by the sub-process and accepted or rejected according to the user's interest as inputted via a screen 311 in FIG. 3B. The user clicks on the messages to be rejected and allows the other messages to be processed for display to the user. The screen 311 permits the user to change message selections at any time, without changing the records in the personal data server 129 (see FIG. 1) at anytime, thereby enabling the personal profile to be current with the users messages interest.

A sub-profile $300^2$ in FIG. 3B, enables the user to install and edit user's private profile information, including phone book information related to age, gender, profession, contact information, picture and other related information that the user wishes to make available to other users in the ad hoc network. Also included in the sub-profile $300^2$ are the user's interest 315, which may be in different categories indicated in a screen 317 in FIG. 3B. The categories include, for example, Art, Present, Dating, and Sports. Each interest is further expanded in a screen 319 in FIG. 3B, listing specific interest in a category.

The sub-profile $300^2$ in FIG. 3B, further includes a shopping list 321 for different merchants, A, B, C, D, each list including key words or merchandise in which the user has an interest as described in an accompanying sub-screen (not shown). The sub-screen allows the user to edit or delete from the contents in the shopping list.

The sub-profile $300^2$ in FIG. 3B, may also include a digital signature 323, which can be generated by the user in the event that merchandise is ordered and payment is required by the merchandiser. Digital signatures and their protection are described in the text *Applied Cryptography* by B Schneier, published by John Wiley & Sons, New York, N.Y., Part 2.6, ISBN 0-471-12845-7), 1996.

For automatically assessing content and services available from an access point, a keyword list and a type list 324 are included in the personal profile 300. The list 324 is matched against a keyword and type list stored in an Access Point and received within the Service Discovery Protocol during connection set up as will be described in FIG. 7A.

Responsive to screen 302 in FIG. 3B, the sub-profile $300^n$ filters user profiles. The sub-profile $300^n$ enables the user to establish a state 325 "accepting all messages", or alternately a state 327 "rejecting all messages", or alternately a state 329 "filtering all messages". This is accomplished using the PICS rules related to user information 313, or using user interests 315, or using shopping list 321. This provides the ability to allow the user to edit/remove keywords filtering the messages.

TABLE A

FORMATTING OF ALL USER PROFILES IN ONE SDP RECORD 400

|  | A | B | C | D | E | F | G | H |
|---|---|---|---|---|---|---|---|---|
| 1 | UserInformation | | | | | | | |
| 2 | | Contact Info | | vCard String | | | | |
| 3 | UserProfile ID | List | | List of Profiles | | | | |
| 4 | | UserProfileID1 | | UserProfile 1 | UUID | | | |
| 5 | | | Version | Profile version | Unit 16 | 0x0100 | | |
| 6 | | | Profile Filter | bitmask | | | Keyword/Type List | |
| 7 | | UserProfileID2 | | UserProfile 2 | UUID | | | |
| 8 | | | Version | Profile version | Unit 16 | 0x0100 | | |
| 9 | | | Profile Filter | bitmask | | | Keyword/Type List | |
| 10 | | UserProfileIDn | | UserProfile n | UUID | | | |
| 11 | | | Version | Profile version | Unit 16 | 0x0100 | | |
| 12 | | | Profile Filter | bitmask | | | Keyword/Type List | |
| 13 | UserDefined | ProfileIDList | | | | | | |
| 14 | | Profile ID 1 | | SupportProfile | UUID | | | |
| 15 | | | FieldName | ProfileVersion | String | | | |
| 16 | | | FieldType | ProfileVersion | Unit 8 | | | |
| 17 | | | FieldValue | ProfileVersion | varies | | | |
| 18 | | Profile ID 2 | | SupportProfile | UUID | | | |
| 19 | | | FieldName | ProfileVersion | String | | | |
| 20 | | | FieldType | ProfileVersion | Unit 8 | | | |
| 21 | | | FieldValue | ProfileVersion | varies | | | |
| 22 | | Profile ID 3 | | SupportProfile | UUID | | | |
| 23 | | | FieldName | ProfileVersion | String | | | |
| 34 | | | FieldType | ProfileVersion | Unit 8 | | | |
| 25 | | | FieldValue | ProfileVersion | varies | | | |

Table A is a representation of user personal profiles formatted in one SDP record, including contact information, standard user profiles including keyword and type lists and user and/or manufacturing profiles Table A shows all user profiles formatted in one Service Discovery Protocol (SDP) record 400 stored in the SDP database 209 (FIG. 2). Table A is organized into eight columns labeled "A" through "H" and into 25 rows labeled "1" through "25". The record 400 shown in Table A includes the contact information part 301 shown in rows 1 and 2, standardized profile part 304 shown in rows 3 through 12, and user and/or manufacturer defined profile part 312 shown in rows 13 through 25.

The contact information part 301 of Table A includes a vCard string shown in Table A at columns E and F, row 2, the contents of which appear in FIG. 4A. FIG. 4A is a representation of a text-encoded vCard format 401 available in the contact information part 301 of Table A. The contact information part 301 includes the name of the individual, telephone for both voice and fax. vCards are an electronic business card for Personal Data Interchange. The vCard facilitates various data interchanges including exchanging business cards, Internet mail, computer/telephone applications and video and data conferencing. The Card is described in the vCard V2.1 specification published by the Internet Mail Consortium at http://www.imc.org/pdi/vcardoverview.html. The Internet Engineering Task force (IETF) has released the specification for vCard version 3. The two parts of the definition are: RFC 2425, *MIME Content-Type for Directory Information* and RFC 2426, *vCard MIME Directory Profile*. In the future, other formats may replace the vCard, such as XML formats based on DTDs.

The standardized profile part 304 of Table A shown in rows 3 through 12, includes User ProfileID lists, such as User ProfileID #1 shown in Table A at column B and C, row 4, and User ProfileID #2 shown in Table A at column B and C, row 7, up to User ProfileID #n shown in Table A at column B and C, row 10. Each User ProfileID profile includes a Version Number shown in Table A at column C, row 5, a profile filter shown in Table A at column C, row 6, a record, e.g. a bit mask shown in Table A at column D, row 6, a UUID shown in Table A at column E, row 4, and a bit mask code shown in Table A at column F, row 5, as represented by reference 306[1] in FIG. 3A and keyword/type lists, as represented by FIG. 4C, in column G.

FIG. 4C illustrates a keyword/type list including the type "advertisement", and the keywords "food; recipes; restaurants; drinks;pizza". These keywords are each separated by a symbol, such as a semicolon. Other type and keyword parameters may be employed. Exemplary types include Warning, Announcement, News, Information, Advertisements, Map, Unknown, etc. In embodiments of the present invention, a standard set of types may be defined so that each Access Point may provide useful and understandable information regarding service types. Keywords may be anything. For example, common keywords may search keywords employed, for example, in an Internet search engine. Such lists of types and/or keywords describe in general the types of content/services are available from an access point.

The User/Manufacturer Defined Profile Part 312 of Table A shown in rows 13 through 25, includes a plurality of Profile IDs shown in Table A at column B, rows 14, 18, and 22. The Profile IDs are each identified by a UUID shown in Table A at column E, row 14, and including a field name shown in Table A at column C, row 15, a field type shown in Table A at column C, row 16 and a field value shown in Table A at column C, row 17 as described in conjunction with reference 314 of FIG. 3A. Each field is associated with a Profile Version shown in Table A at column D, row 15 defined by a bit string shown in Table A at column E, row 15 for the name, a descriptor shown in Table A at column E, row 16 for the format and a parameter shown in Table A at column E, row 17, which varies for the value.

Non-standard profiles 450, as shown in FIG. 4B, may be prepared and included in the SDP record. FIG. 4B is a representation of an XML encoded non-standard profile available in the SDP record of Table A. Each non-standard profile may be XML encoded defining the Document Type, Element and User Profile Version, which track the information content of the standardized profiles 304. The XML program, Version 1.9 is described in the W3C recommendation of February 1998.

information, in one embodiment, includes age, gender, profession and other details as indicated in FIG. 3B. A test is made to determine whether the profiles database 211 should be entered in step 705. A "no" condition exits the phone book and the editing menu in step 707. A "yes" condition activates a profile editing menu (not shown), stored in the memory 215 for preparing a standardized profile 400 in step 709 for storing as an OBEX file in the profile database 211. In step 711, a profile is chosen to fill out among a number

TABLE B

FORMATTING THE USER PROFILES IN ONE SDP RECORD 400
WITH POINTERS TO THE PHONE BOOK AND PROFILES DATABASE

| | A | B | C | D | E | F | G | H |
|---|---|---|---|---|---|---|---|---|
| 1 | UserInformation | | | | | | | |
| 2 | | Index | | Index of the vcard of the user in the PhoneBook | Unit8 | | | |
| 3 | UserProfile ID | List | | List of Profiles | | | | |
| 4 | | UserProfileID1 | | UserProfile 1 | UUID | | | |
| 5 | | | Version | Profile version | Unit 16 | 0x0100 | | |
| 6 | | | Profile Filter | bitmask | | | | |
| 7 | | UserProfileID2 | | UserProfile 2 | UUID | | | |
| 8 | | | Version | Profile version | Unit 16 | 0x0100 | | |
| 9 | | | Profile Filter | bitmask | | | | |
| 10 | | UserProfileIDn | | UserProfile n | UUID | | | |
| 11 | | | Version | Profile version | Unit 16 | 0x0100 | | |
| 12 | | | Profile Filter | bitmask | | | | |
| 13 | UserDefined | ProfileIDList | | | | | | |
| 14 | | Profile ID 1 | | Index in the Profiles DB | Unit8 | | | |
| 15 | | Profile ID 1 | | Index in the Profiles DB | Unit8 | | | |
| 16 | | Profile ID 1 | | Index in the Profiles DB | Unit8 | | | |

Table B is a representation of the user profiles of FIG. 3A, formatted in one Service Discovery Protocol (SDP) record in SDP database 209, with pointers to the Phone book 207 and Profiles database 211. Table B is organized into eight columns labeled "A" through "H" and into 16 rows labeled "1" through "16". The record 400 shown in Table B includes the contact information part 301 shown in rows 1 and 2, standardized profile part 304 shown in rows 3 through 12, and user and/or manufacturer defined profile part 312 shown in rows 13 through 16. Table B shows user profiles 400 formatted in one SDP record with pointers to the phonebook database 207 and profile database 211 (See FIG. 2) in the user's terminal 101. The contact information part 301 of Table B includes an index shown in Table B at column B, row 2 of the vCards in the phone book 313 (FIG. 3B). The standard profile's part 304 of Table B includes a list shown in Table B at column D, row 3 of user profile IDs, as described in Table A. The user and/or manufacturer defined profiles 312 of Table B include an index shown in Table B at column D, row 14, list of profile IDs, as described in Table A. A user may use the index shown in Table B at column B, row 2, the list shown in Table B at column D, row 3 and the index shown in Table B at column D, row 14, to point to the profile in the SDP database 209 shown in FIG. 2.

Figure 5:
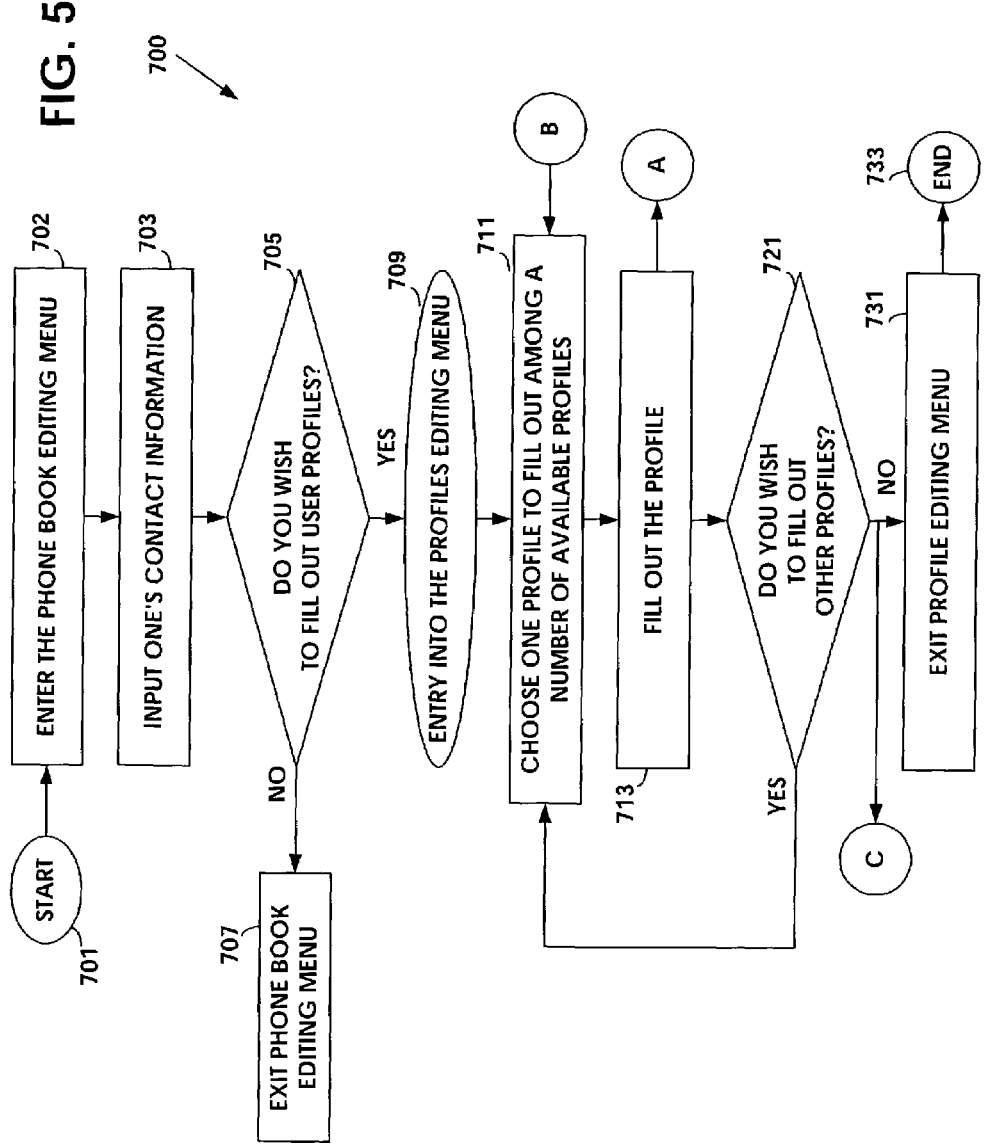
FIG. 5 describes a method for creating and editing personal profiles, according to one embodiment of the present invention.

FIG. 5 in conjunction with FIG. 2, describes a process 700 for creating and editing profiles in the user's mobile terminal 101. In step 701, the process starts and the phone book database 207 is entered in step 702. A phonebook editing menu (not shown) stored in the memory 215, is activated to input the user's contact information in step 703. The contact of available profiles related to interest, shopping lists, etc. In step 713, the process transfers to entry point A in FIG. 6 if the user wishes to complete the profile. Otherwise, step 721 determines the user interest in completing other profiles. A "yes" selection returns the process to step 711 and 713. A "no" selection exits the profile-editing menu in step 731 and the process ends in step 733.

Figure 6:
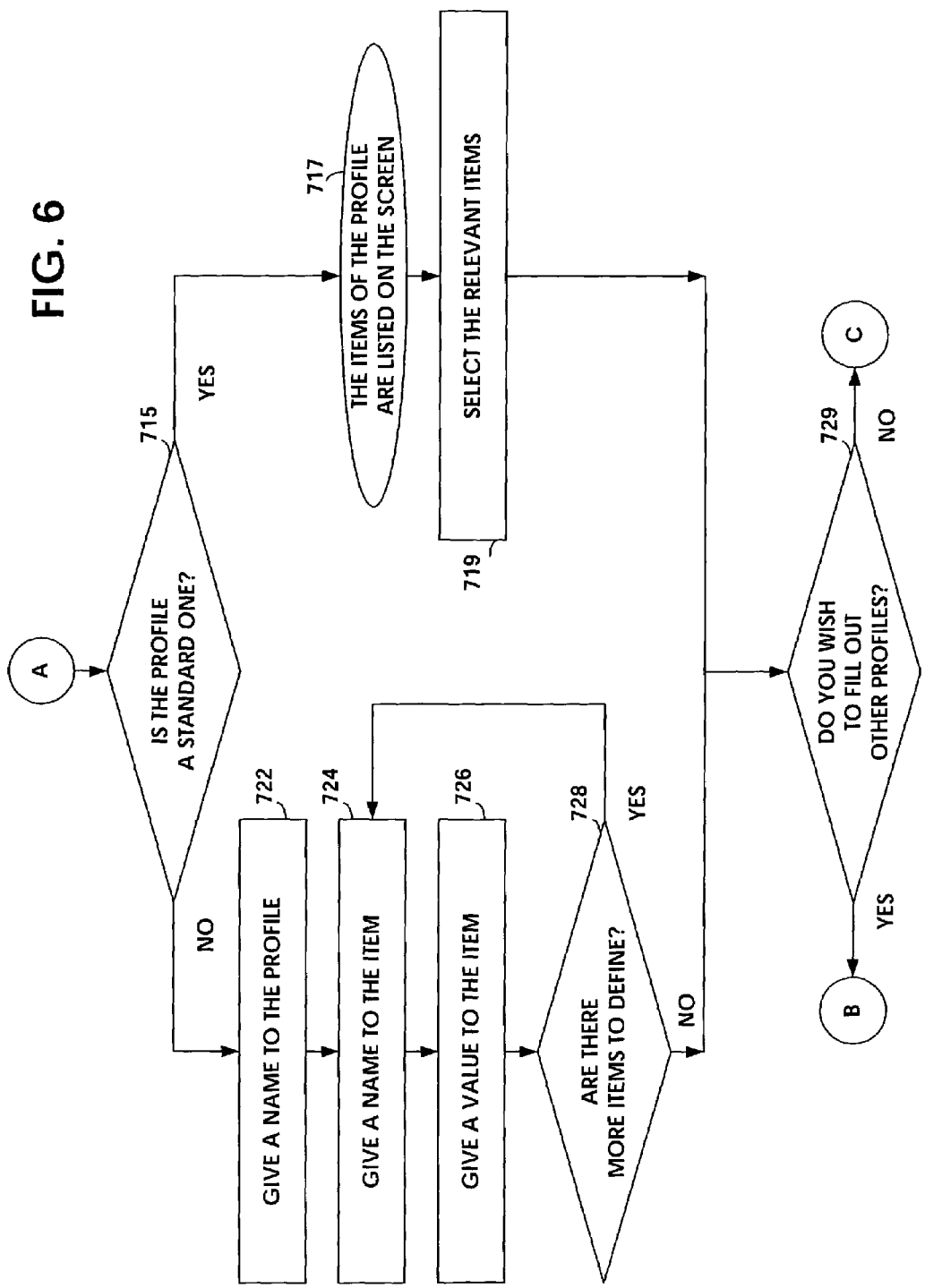
FIG. 6 describes a method for filling out profiles of FIG. 3A for entry in the SDP records of Table A, according to an embodiment of the present invention.

In FIG. 6, a test is made in step 715 to determine whether the profile is standard format or not. A "yes" condition initiates step 717 whereby the profile items and categories are displayed on the terminal screens 302, 311, 317, 319 and the like described in FIG. 3B. The relevant items are selected in step 719 to complete the profile, which is stored as an SDP service record in the SDP database 209 or as an OBEX file in the profiles database 211. In step 729 the user is queried to determine interest in completing other profiles. A "yes" selection transfers the process to entry point B in FIG. 5 for repeat of steps 711 and 713. A "no" selection transfers the process to entry point C in FIG. 5, where the profile editing menu is exited in step 731.

In FIG. 6, if the user wishes to enter a non-standard profile in either the SDP database 209 or the profile database 211, e.g. a User/Manufacturer Defined Profile 312 (FIG. 3A), step 722 is performed to assign a name to the profile. A name or format assigned is assigned to the item in step 724 and a value is assigned to the item in step 725. A test 728 is performed to determine if additional items are to be defined. A "yes" selection returns the process to step 724. A "no" selection transfers the process to step 729 where a "yes" selection returns the process to entry point B and steps 711, 713 in FIG. 5, as previously described in FIG. 5. A "no" selection returns the process to entry point C in FIG. 5, as previously described.

FIG. 7 describes a process 800 according to an embodiment of the present invention for an inquiring Bluetooth terminal or Access Point 801, such as the inquiring device 119 of FIG. 1, to access the personal profile of the user's Bluetooth Terminal 803, such as the user's wireless terminal 101 of FIG. 1, having user profile support, using the Bluetooth packet structure and SDP Service Search Request format. In step 805, the inquiring terminal 801 transmits a user Bluetooth inquiry 805 and the user 803 responds with an inquiry response 807. The inquiring terminal 801 sends an SDP inquiry in step 809 to determine whether the user's terminal support's user personal profiles. In step 811, the user 803 provides an SDP inquiry response indicating that the personal profiles are available. The inquiring terminal 801 may read all or part of the profiles and submits multiple SDP inquiries, if necessary, in step 813. The user 803 responds to the SDP inquiries in step 815. The inquiring terminal 801 retrieves more detailed contact information profiles, not available to SDP, by means of an OBEX request 817 using object exchange protocols. Object exchange (OBEX) protocols are described in the Infrared Data Association, Version 1.2, PO Box 3883, Walnut Creek, Calif. USA 94958. Multiple OBEX requests 817 may be made by the inquiring terminal 801 and the user 803 provides OBEX responses to the requests in step 819, after which the process ends.

Figure 7A:
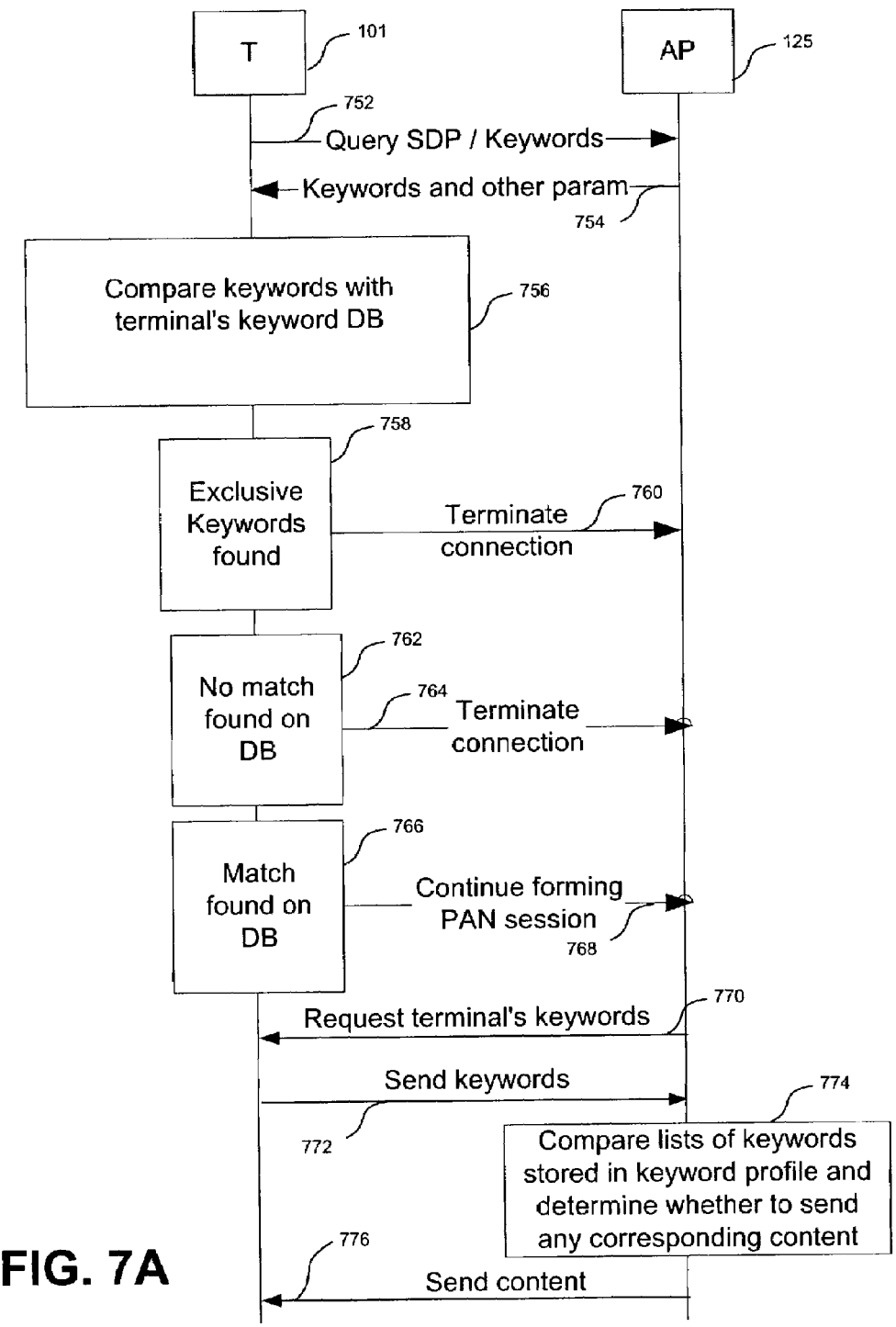
FIG. 7A describes a method incorporating the principles of the present invention for automatically determining Access Point Content and Services by a terminal in a short range communication system.

FIG. 7A is a flowchart illustrating a service discovery process, according to an embodiment of the present invention, for obtaining services and content information stored at the Access Point in an SDP record shown in Table C. The record contains rows and columns describing the various sevices and content accessible to the user. In the column entitled "Service/Content" the various services, content and keywords related to the content are listed. Columns A . . . G describe details of various service types and content types. The service provider name and MAC number are provided which enables a user to classify whether a service is accepted based on the cleartext name and corresponding MAC. Service details include payment information or authentication information informing the user whether the service is costing something and what type of authentication the service requires. Also, information is provided in the Table indicating whether the service is local or accessible through, e.g. the Internet, indicating what is needed to actually contact the service. The content type is described and related to keywords.

Now returning to FIG. 7A, the process is described with reference to the system 100 of FIG. 1. However, this process may be employed in other network topologies and implementations. This process advantageously allows devices, such as the user's terminal 101, to receive content based on personalized preferences stored in form of content keywords and/or service types in the keyword database 212 of the user's terminal 101. In addition, this process allows content filtering to be performed automatically within existing Bluetooth communications conventions.

This process begins with a step 752. In this step, the user's terminal 101 sends an SDP request to the access point 125. This request indicates that the user's terminal 101 wishes to obtain one or more lists of keywords or service information. This request may be formatted as a Bluetooth Service Search Attribute Request packet.

Next, in a step 754, the user's terminal 101 receives an SDP response from the access point 125. This response includes one or more lists of keyword(s) In addition, this response may include additional parameters, such as one or more descriptors that each indicate a service type as shown in Table C. This response may be formatted as a Bluetooth Service Search Attribute Request packet. In a step 756, the user's terminal 101 displays the service types for user selection purposes and proceeeds to compare the list of keywords received in the response with keywords stored in the personal profile database 211. A software routine may be employed to perform the comparison.

In a step 758, the user's terminal 101 determines whether this response includes any exclusive keywords stored in the keyword database 106. The presence of exclusive keywords indicates that content and/or services that the user is not interested in. If so, operation proceeds to a step 760, where the connection between the user's terminal 101 and the access point 125 is terminated. Otherwise, a step 762 is performed. In this step, terminal 102 determines whether the response includes any inclusive keywords stored in keyword database 106. The presence of inclusive keywords indicates that content and/or services that the user is interested in. If so, then a step 768 is performed. Otherwise, operation proceeds to a step 764, where the connection between terminal 102 and access point 125 is terminated.

In step 768, the establishment of a session between the user's terminal 101 and the access point 125 continues. This step may include establishing secure link between the user's terminal 101 and the access point 125 through processes such as authentication. In addition, this step 768 may include the user's terminal 101 sending a request to the access point 125 for the delivery of content items. Examples of content items include hypertext documents, images, data files, database entries, multimedia broadcasts, and audio broadcasts. As described above with reference to FIG. 1, these content items may be stored in various entities, such as the access point 125, and the server 130.

Situations may occur where the SDP response received in step 754 includes at least one exclusive keyword and at least one inclusive keyword. In embodiments of the present invention, a connection with the access point 125 may be established, pursuant to step 768, even when matches exist with both one or more exclusive keywords and with one or more inclusive keywords. Accordingly, in these embodiments, when an exclusive keyword match is identified in step 758, operation continues to step 762 so that the user's terminal 101 may determine whether any inclusive keyword matches exist that indicate content that is interesting to the user.

Following step 768, optional steps 770–776 may be performed. These steps involve the access point 125 determining whether there is information that it may automatically deliver or "push" to the user's terminal 101 without first receiving a specific request. In step 770, the access point 125 sends to the user's terminal 101 a request for the keywords stored in the personal profile database 211. In response, a step 772 is performed. In this step, the user's terminal 101 retrieves the keywords stored in its personal profile database 211 and sends these keywords to the access point 125.

Next, in a step 774, the access point 125 compares the list of keywords with each of the lists of keywords stored in SDP database 262 and determines whether to send any corresponding content. During this step, the access point 125 determines whether any of the lists in its SDP database 262 contain any exclusive keywords received from the user's terminal 101. If so, then the access point 125 does not send content associated with these lists. In addition, the access point 125 determines during step 774 whether the remaining lists contain any inclusive keywords received from the user's terminal 101. If so, then content corresponding to the these inclusive keywords is designated for transmission to the user's terminal 101. In step 776, the access point 125 sends the content designated for transmission step 774 to the user's terminal 101.

The steps of FIG. 7A may be performed in other sequences. Furthermore, FIG. 7A shows steps 770–776 being performed in addition to steps 752–768. However, in embodiments of the present invention, these steps may be performed as an alternative to steps 752–768.

TABLE C

FORMATTING OF ACCESS POINT SERVICE PROFILES IN ONE SDP RECORD

| Service/Content | A | B | C | D | E | F | G |
|---|---|---|---|---|---|---|---|
| Service Type | Tele-Op Ident. | Internet Op. Ident. | Local Serv.Prov | Com'cation | Com'cation | | |
| Serv. Prov. Name | iiiii | yyyyy | zzzzz | abc | xyz | | |
| Ser. Prov. MAC | | | | 00001 | 00011 | | |
| Serv. Details | Payment Infor. | Payment Infor. | Payment Infor. | Free Internet Conn. | Internet Connect Charge | | |
| | Authen. Infor. Local Access | Authen. Infor. Contact Infor. | Authen. Infor. | Authen. Infor. | Authen. Infor. | | |
| Content Type | Adv'ment | Warning | Ann'ment | News | Info | Map | Local Airport |
| Keywords | Food; recipes; | Fire; Police; | Sales; Shows; | Local; National; | Health; Auto; | Local; NYC; | Finnair; Tax Free Shop; |
| | res'rants; | | Events; | Inter'ional | Travel; | USA; | Local Coffee Shop |
| | drinks; | | | | | | Local Res'rant |
| | pizza; | | | | | | |

Figure 8:
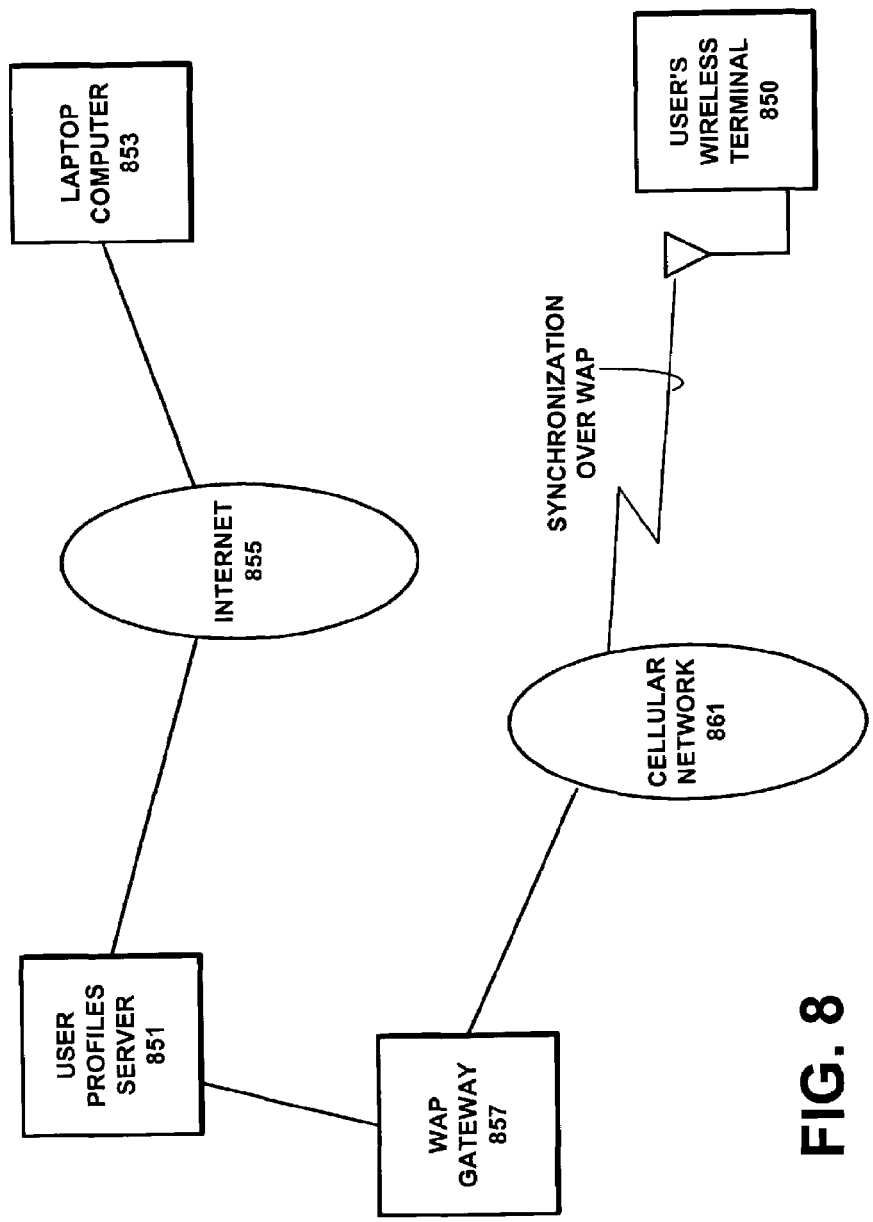
FIG. 8 describes an alternative embodiment for storing user profiles outside the user's mobile terminal 900.

FIG. 8 describes an alternative embodiment for storing user profiles outside the user's mobile terminal 850. The profiles may be stored in a user profile server 851 linked to the desktop computer or laptop 853 via Internet 855. The user may use the desktop computer or laptop 853 to create, edit and alter profiles in the profile server. The user's mobile terminal 850 has access to the profile server 851, via a Wireless Application Protocol (WAP) gateway 857, serving a cellular telephone network 861 to which the mobile terminal 850 has access. The gateway implements the Wireless Application Protocol supported by and available from the WAP Forum. Any Bluetooth inquiries for personal profiles can be sent to the user profile server 851, via the WAP gateway linked to the Internet for accessing the user profile server. The profiles are downloaded to the user's mobile terminal 850 for response to inquiries from other terminals in an ad hoc network. Storing the personal profiles in the server 851 reduces the storage load on the phone book, SDP, and profile databases in the user's mobile terminal shown in FIG. 2.

The resulting invention enables the user of a wireless, mobile terminal to install a personalized user profile in his/her terminal and to update that profile in real time. For example, the invention enables a sales representative to update his/her virtual business card in real time to match the perceived interests of a potential customer. As another example in a dating/match-making scenario, during a chance meeting involving the exchange of virtual business cards, the user may can modify his/her personal interest information in real time, to match the perceived interests of the other user.

Figure 9:
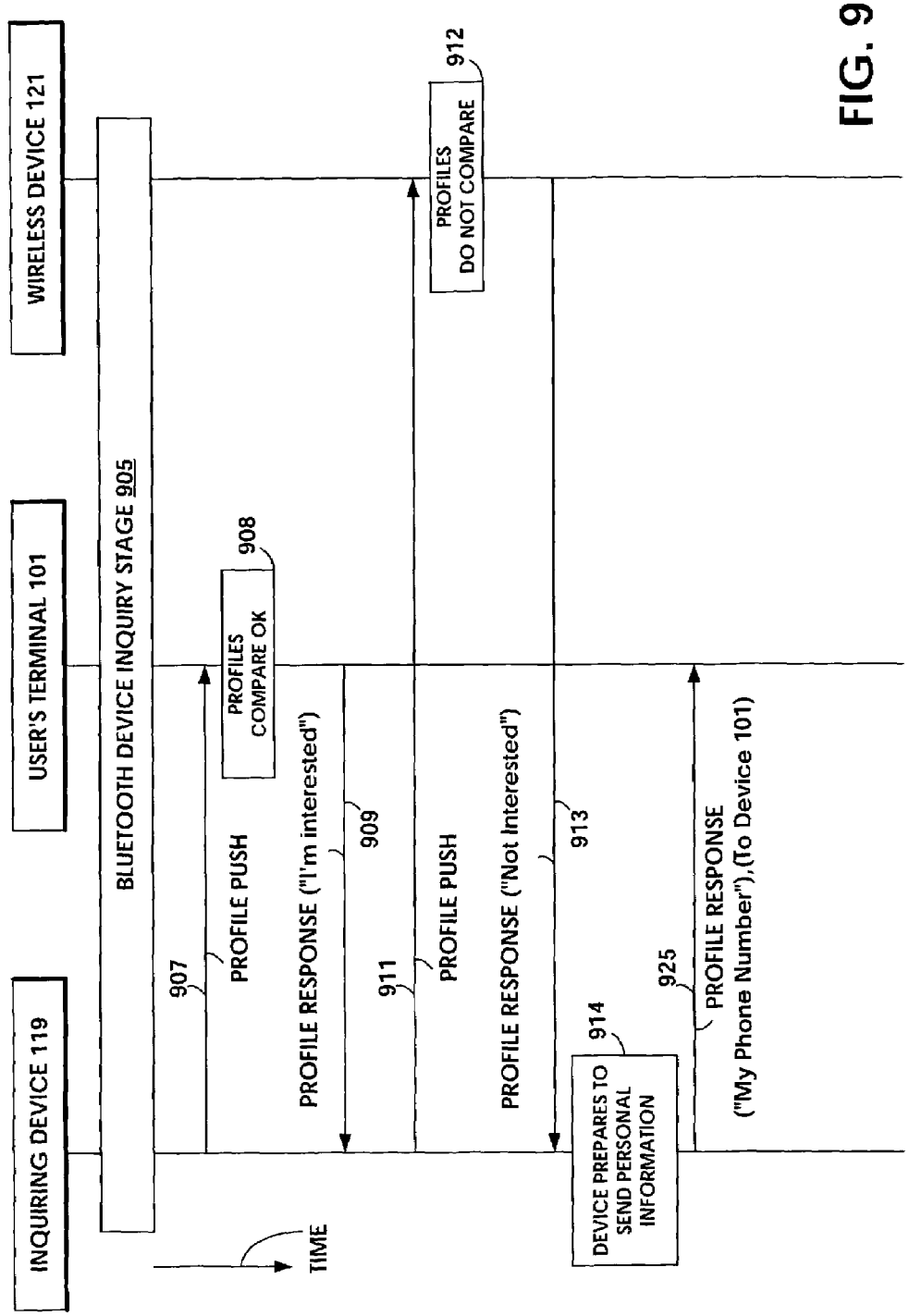
FIG. 9 is a network process diagram of an embodiment of the invention using profile push and profile comparison between two Bluetooth devices.

In an alternate embodiment of the intention, a push-mode enables the user's terminal to broadcast user profile information. FIG. 9 is a network process diagram of an embodiment of the invention using profile push and profile comparison between two Bluetooth devices. Inquiring device 119, user's terminal 101, and wireless device 121 engage in a Bluetooth device inquiry stage 905. Then, inquiring device 119 sends a profile push message 907 to the user's terminal 101. The profile push message 907 contains enough information to characterize the profile in inquiring device 119 so as to enable user's terminal 101 to compare the similarity between the user profiles in the two devices. Such characterizing information can be some limited information about the user or the user's device 119, for example. Such characterizing information can be a bit mask, which can be examined by the user's terminal 101 in step 908, comparing its value with reference bit mask values indicating any generic interests. In this example, user's terminal 101 determines at step 908 that the two user profiles compare sufficiently to justify expressing an interest in obtaining more information about the profile of inquiring device 119. Then the user's terminal 101 returns a profile response 909, such as "I'm interested", to the inquiring device 119. In the meantime, the inquiring device 119 sends another profile push message 911 to the wireless device 121, similar to message 907. In this example, the wireless device 121 determines at step 912 that the two user profiles do not compare Then the wireless device 121 returns a profile response 913, such as "Not interested", to the inquiring device 119. In response to the profile response 909, "I'm interested", sent by the user's terminal 101 to the inquiring device 119, the inquiring device 119 prepares to send personal information in step 914. The inquiring device 119 sends a profile message 925 to the user's terminal 101 with the profile information "My Phone Number".

Figure 10:
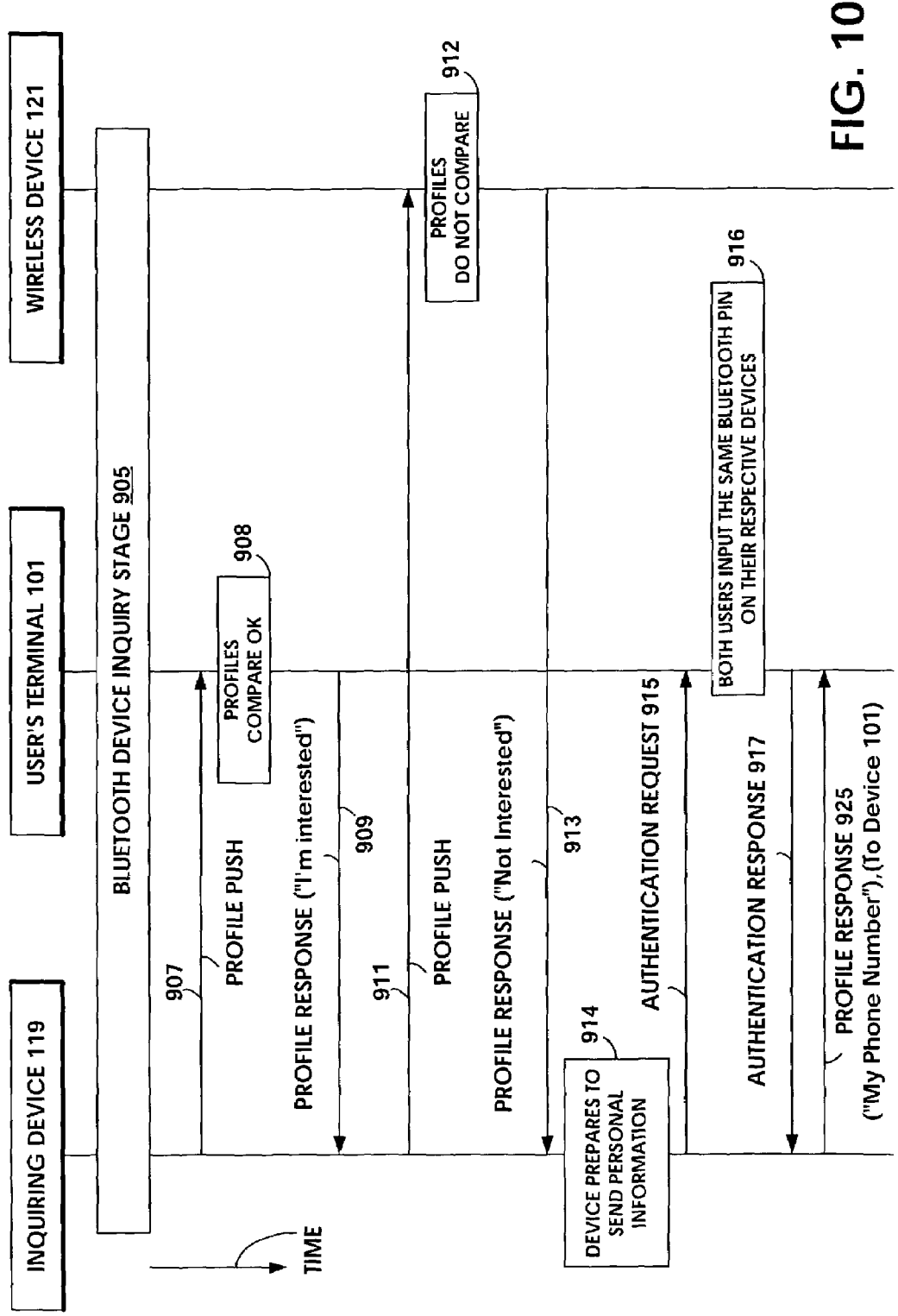
FIG. 10 is a network process diagram of the embodiment of FIG. 9, adding authentication between the two Bluetooth devices.

FIG. 10 is a network process diagram of the embodiment of FIG. 9, adding authentication between the two Bluetooth devices. Following step 914, the inquiring device 119 sends an authentication request 915 to the user's terminal 101. In step 916, both users input the same PIN on their respective devices 101 and 119. Then the user's terminal 101 returns an authentication response 917 to the inquiring device 119. Then, the inquiring device 119 sends the profile message 925 to the user's terminal 101 with the profile information "My Phone Number".

In another alternate embodiment of the intention, the user's short-range wireless terminal can share information in its personal profile with the inquiring wireless terminal, if their respective user profiles match within a predefined tolerance.

In another alternate embodiment of the intention, the user's short-range wireless terminal can share the general information portion of his/her local user profile with another short-range wireless terminal, if their respective user profiles have a first level of close matching. If their respective user profiles have a second level of closer matching, the two terminals can further share more detailed information in their respective user profiles.

General information can be transferred in a push model, without authentication of the receiving party and even without Bluetooth encryption. However, sending of the more detailed, private part of the user's profile should be protected by Authentication and Encryption. For example, before sending the more detailed, private part of the profile, the sending device triggers the exchange of the Bluetooth PIN between the sender and the receiver (if that has not been done before) to turn on the encryption of the baseband connection. In the same way, and in the case of the Pull model, the Pull request for the more detailed, private part of the profile triggers the device owning the profile to request Authentication of the device that issues the Pull request.

Bluetooth Authentication usually requires that the two users exchange the PIN outside the channel, such as orally. In some scenarios, this may not desirable. The invention provides other ways for the two users to share a secret without orally communicating with each other. The server 129 in FIG. 1 can provide matchmaking via Bluetooth links by registering users, such as the users of devices 101 and 119. Registration can include checking user qualifications for matchmaking, such as being above a certain age. Then, when the two respective registered users of devices 101 and 119 try to exchange privacy sensitive information without having to actually engaged in a conversation with each other, they link to the server 129, which delivers the same PIN to both devices 101 and 119, thereby enabling the Bluetooth Authentication procedure to run automatically in the background for both devices 101 and 119.

In addition to the Bluetooth standard, the resulting invention applies to wireless standards such as the IEEE 802.11 Wireless LAN standard, the HIPERLAN standard, the IEEE 802.15 Wireless Personal Area Network (WPAN) standard, the Infrared Data Association (IrDA) standard, the Digital Enhanced Cordless Telecommunications (DECT) standard, the Shared Wireless Access Protocol (SWAP) standard, the Japanese 3rd Generation (3G) wireless standard, and the Multimedia Mobile Access Communication (MMAC) Systems standard of the Japanese Association of Radio Industries and Businesses.

For example, the present invention may be employed in WLAN environments, where end-users are served by various WLAN networks. In some WLAN environments, end users are not able know all the WLAN network names (SSIDs) which are capable to serving them. Therefore, end user terminals may receive communications from access points that contain SSIDs. In certain environments, access points may transmit SSID in Beacon frames. However, in other environments, SSIDs may be obtained through the use of probe messages, as described in IEEE 802.11-01/658r0. This document is incorporated herein by reference in its entirety.

These probe messages involve a user terminal transmitting one or more Probe_Request messages that each request an SSID. If an access point supports the requested SSID, it replies with a Probe_Response message that indicates an SSID that it supports. The present invention, while described above in the context of SDP communications, may employ such probe messages to automatically determine access point content and services. Accordingly, in one such embodiment, the terminal may send a Probe_Request message to gather content and service type information, such as the aforementioned keywords and service types. An access point receives this request and, in return, transmits a Probe_Response message to the user terminal thast includes such content and service type information.

While the invention has described in connection with a preferred embodiment, various changes can be made without departing from the spirit and scope of the invention.

What is claimed is:

1. A method, in a wireless access point comprising the steps of:

maintaining a list indicative of the contents of services accessible through the wireless access point in a database;

engaging in a connection set-up procedure with a terminal device;

receiving a service discovery protocol request for supported services from the terminal device during the connection set-up procedure;

transmitting, by the wireless access point in response to the service discovery protocol request, information relating to supported services and the list indicative of the contents of services accessible through the wireless access point to the terminal device included in a service discovery protocol response during the connection set-up procedure; and receiving a request from the terminal device during the connection set-up procedure, the request to establish a service session with the wireless access point, wherein the request is based on a determination of the transmitted service discovery protocol response including the information relating to the supported services and the list indicative of contents of available services accessible through the wireless access point by the terminal device.

2. The method of claim 1 further comprising the steps of:

including in the list a field indicative of a service type available from the first terminal device.

3. The method of claim 1 further comprising the step of:

including in the list a field indicative of the content/topic of a service type from the first terminal device.

4. The method of claim 1 further comprising the step of:

including in the list a field indicative of both the service type and the content/topic of the service available from the first terminal device.

5. The method of claim 1 further comprising the step of:
including in the second terminal device a profile including a keyword list and a type list definitive of services and content of interest to a user.

6. The method of claim 5 further comprising the step of: defining the keyword list in terms of at least one search words in a distributed information network.

7. The method of claim 6 further comprising the step of: separating search terms in a query by a punctuation mark.

8. The method of claim 5 further comprising the step of: defining the type list in terms of information sources.

9. The method of claim 1 further comprising the step of: creating and storing keywords relating to communications content in a profile in the first terminal device.

10. The method of claim 1, wherein the short-range wireless communications network is a Bluetooth network.

11. The method of claim 10, wherein the first terminal device is an access point.

12. The method of claim 1 further comprising the step of: including in the list a field indicative of a service provider of the service available from the first terminal device.

13. The method of claim 12, wherein the field includes a MAC of the service provider.

14. The method of claim 12, wherein the field includes a cleartext name of the service provider.

15. The method of claim 1 further comprising the step of: including in the list a field indicative of cost details of the service available from the first terminal device.

16. A method, comprising the steps of:
maintaining a list indicative of the contents of available services in a database;
engaging in a connection set-up procedure with a second terminal device;
receiving a request for information of available services from the second terminal device during the connection set-up procedure, the request including a query to obtain a list of keywords and types in a first terminal device;
transmitting, by a first terminal device in response to the request, the list indicative of the contents of available services to the second terminal device within service discovery protocol during connection set-up; and
receiving a request from the second terminal device to establish a service session with the first terminal device, wherein the request is based on a determination of the transmitted list by the second terminal device.

17. The method of claim 16 further comprising the step of: comparing the keywords in the second terminal device to the keywords in the first terminal device.

18. The method of claim 16 further comprising the step of: establishing a session between the first and second terminal device when an inclusive keyword is identified by the second terminal device.

19. The method of claim 16 further comprising the step of: matching the keywords associated with first and second terminal keyword devices in the second terminal device.

20. The method of claim 16 further comprising the step of: terminating a connection between the first and second terminals when no match is found between keyword in the first and second terminal devices.

21. The method of claim 16 further comprising the step of establishing a session between the first and second terminal devices when a keyword match exists between the keyword lists of the first and second terminal devices.

22. A method, comprising the steps of:
maintaining a list indicative of the contents of available services in a database;
engaging in a connection set-up procedure with a second terminal device;
receiving a request for information of available services from the second terminal device during the connection set-up procedure;
transmitting, by a first terminal device in response to the request, the list indicative of the contents of available services to the second terminal device within service discovery protocol during connection set-up;
receiving a request from the second terminal device to establish a service session with the first terminal device, wherein the request is based on a determination of the transmitted list by the second terminal device;
requesting a list of second terminal keywords by the first terminal device; and
determining by the first terminal device if there is content to push to the second terminal device.

23. A short-range wireless communication system, comprising:
a database in a first terminal device, the database comprising a list of information indicating content of services available to a first terminal device;
a transmitter for transmitting the list to a second terminal device within service discovery protocol during connection set-up;
a receiver in the second terminal device receiving the transmitted list indicative of the contents of available services at the first terminal device;
a determining apparatus in the second terminal device for determining whether to establish a service session with the remote device based on the received list;
a profile in the second terminal device including a keyword list and a type list definitive of services and content of interest to a user; and
a querying apparatus which queries the first terminal device by the second terminal device to obtain a list of keywords and types in the first terminal device.

24. The system of claim 23 further comprising:
a field in the list indicative of a service type available from the first terminal device.

25. The system of claim 23 further comprising:
a field in the list indicative of the content/topic of a service type from the first terminal device.

26. The system of claim 23 further comprising:
a field in the list indicative of both the service type and the content/topic of the service available from the first terminal device.

27. The system of claim 23 further comprising:
a profile in the second terminal device including a keyword list and a type list definitive of services and content of interest to a user.

28. The system of claim 23 further comprising:
the keyword list defined in terms of at least one search words in a distributed information network.

29. The system of claim 23 further comprising:
a separating apparatus which separates search terms in a query by a punctuation mark.

30. The system of claim 23 further comprising:
a defining apparatus which defines the type list in terms of information sources.

31. The system of claim 23 further comprising:
a comparing apparatus which compares the keywords in the second terminal device to the keywords in the first terminal device.

32. The system of claim 23 further comprising:
a connecting apparatus which establishes a session between the first and second terminal device when an inclusive keyword is identified by the second terminal device.

33. The system of claim 23 further comprising:
a matching apparatus which matches the first and second terminal keyword devices in the second terminal device.

34. The system of claim 23 further comprising:
terminating apparatus which terminates a connection between the first and second terminals when no match is found between keywords in the first and second terminal devices.

35. The system of claim 23 further comprising
a session apparatus which establishes a session between the first and second terminal devices when keyword matches occurs in the keyword lists of the first and second terminal devices.

36. The system of claim 23 further comprising:
a creating and storing apparatus which creates and stores keywords relating to communication protocols in a profile in the first terminal device.

37. The system of claim 23 wherein the short-range wireless communications network is a Bluetooth network.

38. The system of claim 23 wherein the first terminal device is an access point.

39. The system of claim 23 further comprising:
a field in the list indicative of a service provider of the service available from the first terminal device.

40. The system of claim 39, wherein the field includes a MAC of the service provider.

41. The system of claim 39, wherein the field includes a cleartext name of the service provider.

42. The system of claim 23 further comprising:
a field indicative of cost details of the service available from the first terminal device.

43. A short-range wireless communication system, comprising:
a database in a first terminal device, the database comprising a list of information indicating content of services available to a first terminal device;
a transmitter for transmitting the list to a second terminal device within service discovery protocol during connection set-up;
a receiver in the second terminal device receiving the transmitted list indicative of the contents of available services at the first terminal device;
a determining apparatus in the second terminal device for determining whether to establish a service session with the remote device based on the received list;
a profile in the second terminal device including a keyword list and a type list definitive of services and content of interest to a user;
a requesting apparatus which requests a list of second terminal keywords by the first terminal device; and
a determining apparatus in the which determines if there is content to push to the second terminal device.

44. A method in a short-range wireless terminal, the method comprising:
(a) engaging in a connection set-up procedure with a remote device;
(b) sending a service discovery protocol request to the remote device for receiving information relating to the supported services of the remote device;
(c) receiving a service discovery protocol response from the remote device, the service discovery protocol response including the requested information relating to the supported services and a list indicative of contents of available services accessible through the remote device; and
(d) determining, during the connection set-up procedure with the remote device, whether to establish a service session with the remote device based on the received service discovery protocol response including the requested information relating to the supported services and the list indicative of contents of available services accessible through the remote device.

45. The method of claim 44, wherein step (b) comprises sending a Bluetooth Service Discovery Protocol (SDP) request.

46. The method of claim 44, wherein step (c) comprises receiving a Bluetooth Service Discovery Protocol (SDP) response.

47. The method of claim 44, wherein step (a) comprises receiving a packet, wherein the packet includes a class-of-device (CoD) field that indicates content services information is available from the remote device.

48. The method of claim 47, wherein the packet is a Bluetooth frequency hop synchronization (FHS) packet.

49. The method of claim 44, wherein step (d) comprises terminating the connection with the remote device when the list includes one or more exclusive keywords.

50. The method of claim 44, wherein step (d) comprises establishing a session with the remote device when the list includes one or more inclusive keywords.

51. A method in a short-range wireless terminal, the method comprising:
(a) establishing a connection with a remote device;
(b) sending a request to the remote device for a list indicating contents of services provided by the remote device;
(c) receiving the list from the remote device, the list including one or more keywords;
(d) determining whether to establish a service session with the remote device based on the one or more keywords; and
(e) receiving a request from the remote device for a list of keywords.

52. A method in a short-range wireless communications network, said method comprising the steps of:
maintaining a list indicative of the contents of available services in a database accessible to a first terminal device;
transmitting the list indicative of the contents of available services to a second terminal device within service discovery protocol during connection set-up;
disclosing the list indicative of the contents of available services in the second device;
requesting a list of second terminal keywords by the first terminal device; and
determining by the first terminal device if there is content to push to the second terminal device.

53. A short-range wireless communication system, comprising:
a database in a first terminal device, the database comprising a list of information indicating content of services available to a first terminal device;
a transmitter for transmitting the list to a second terminal device within service discovery protocol during connection set-up;
a receiver in the second terminal device receiving the transmitted list indicative of the contents of available services at the first terminal device;

a profile in the second terminal device including a keyword list and a type list definitive of services and content of interest to a user;
a requesting apparatus which requests a list of second terminal keywords by the first terminal device; and
a determining apparatus in the first terminal device which determines if there is content to push to the second terminal device.

54. An apparatus, comprising:
a database configured to maintain a list indicative of the contents of available services; and
a communications interface configured to:
    engage in a connection set-up procedure with a terminal device,
    receive a request for information of available services from the terminal device during the connection set-up procedure,
    receive a request for information of available services from the terminal device during the connection set-up procedure, the request including a query to obtain a list of keywords and types in a first terminal device,
    transmit, in response to the request, the list indicative of the contents of available services to the terminal device within service discovery protocol during connection set-up,
    receive a request from the terminal device to establish a service session with the first terminal device, wherein the request is based on a determination of the transmitted list by the terminal device.

55. The apparatus of claim 54, wherein said communications interface comprises a transceiver.

56. An apparatus, comprising:
a database configured to maintain a list indicative of the contents of available services;
a communications interface configured to:
    engage in a connection set-up procedure with a terminal device,
    receive a request for information of available services from the terminal device during the connection set-up procedure,
    transmit, in response to the request, the list indicative of the contents of available services to the terminal device within service discovery protocol during connection set-up,
    receive a request from the terminal device to establish a service session with the first terminal device, wherein the request is based on a determination of the transmitted list by the terminal device, and
    request a list of keywords from the terminal device; and
a processor configured to determine if there is content to push to the terminal device.

57. The apparatus of claim 56, wherein said communications interface comprises a transceiver.

58. An apparatus, comprising:
a communications interface configured to:
    establish a connection with a remote device,
    send a request to the remote device for a list indicating contents of services provided by the remote device,
    receive the list from the remote device, the list including one or more keywords, and
    receive a request from the remote device for a list of keywords; and
a processor configured to determine whether to establish a service session with the remote device based on the one or more keywords.

59. The apparatus of claim 58, wherein the communications interface comprises a transceiver.

60. An apparatus, comprising:
a database configured to maintain a list indicative of the contents of services accessible through the apparatus; and
a communications interface configured to:
    engage in a connection set-up procedure with a terminal device,
    receive a service discovery protocol request for supported services from the terminal device during the connection set-up procedure,
    transmit in response to the service discovery protocol request, information relating to supported services and the list indicative of the contents of services accessible through the apparatus to the terminal device included in a service discovery protocol response during the connection set-up procedure, and
    receive a request from the terminal device during the connection set-up procedure, the request to establish a service session with the apparatus, wherein the request is based on a determination of the transmitted service discovery protocol response including the information relating to the supported services and the list indicative of contents of available services accessible through the apparatus by the terminal device.

61. The apparatus of claim 60, wherein the communications interface comprises a transceiver.

62. An apparatus, comprising:
a communications interface configured to:
    engage in a connection set-up procedure with a remote device,
    send a service discovery protocol request to the remote device for receiving information relating to the supported services of the remote device, and
    receive a service discovery protocol response from the remote device, the service discovery protocol response including the requested information relating to the supported services and a list indicative of contents of available services accessible through the remote device; and
a processor configured to determine, during the connection set-up procedure with the remote device, whether to establish a service session with the remote device based on the received service discovery protocol response including the requested information relating to the supported services and the list indicative of contents of available services accessible through the remote device.

63. The apparatus of claim 62, wherein the communications interface comprises a transceiver.

* * * * *